(12) United States Patent
Sakayanagi et al.

(10) Patent No.: US 11,370,411 B2
(45) Date of Patent: Jun. 28, 2022

(54) CONTROL DEVICE OF VEHICLE

(71) Applicant: TOYOTA JIDOSHA KABUSHIKI KAISHA, Toyota (JP)

(72) Inventors: Yoshihiro Sakayanagi, Mishima (JP); Ryunosuke Watanabe, Tokyo (JP); Mitsuji Sampei, Tokyo (JP); Hiroto Yoshioka, Tokyo (JP); Tatsuya Ibuki, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 213 days.

(21) Appl. No.: 16/671,980

(22) Filed: Nov. 1, 2019

(65) Prior Publication Data

US 2020/0172081 A1    Jun. 4, 2020

(30) Foreign Application Priority Data

Nov. 30, 2018 (JP) .............................. JP2018-224474

(51) Int. Cl.
*B60W 20/13* (2016.01)
*B60W 30/182* (2020.01)
(Continued)

(52) U.S. Cl.
CPC .............. *B60W 20/12* (2016.01); *B60K 6/26* (2013.01); *B60W 10/06* (2013.01); *B60W 10/08* (2013.01); *B60W 30/18127* (2013.01); *B60W 50/0097* (2013.01); *B60L 7/10* (2013.01); *B60W 2510/244* (2013.01); *B60W 2510/30* (2013.01);
(Continued)

(58) Field of Classification Search
CPC .... B60W 20/11; B60W 20/12; B60W 30/182; B60W 2530/00; B60W 2556/10; B60W 50/0097; G01C 21/3469; Y02T 10/62; G08G 1/0129; B60L 15/2045
See application file for complete search history.

(56) References Cited

U.S. PATENT DOCUMENTS 6,314,347 B1 * 11/2001 Kuroda ................. B60W 20/00
701/22
2004/0144087 A1 * 7/2004 Kondou .................. F01N 3/021
60/295

(Continued)

FOREIGN PATENT DOCUMENTS

CN    108116241 A  *  6/2018
DE    102011083677 A1 *  4/2013    ......... G01C 21/3697

(Continued)

OTHER PUBLICATIONS

Appendix F, "Probability Distributions, Parameters, and Terminology", from Guidelines for Chemical Process Quantitative Risk Analysis, Second Edition, Center for Chemical Process Safety, Copyright (c) 2000 American Institute of Chemical Engineers, pp. 689-694 (Year: 2000).*

(Continued)

*Primary Examiner* — David A Testardi
(74) *Attorney, Agent, or Firm* — Oliff PLC

(57) ABSTRACT

A control device of a vehicle comprises a vehicle control part 61 configured to use a probability distribution of at least one predetermined parameter to calculate an expected value of each of at least one evaluation value and control the vehicle 1 based on the expected value.

4 Claims, 15 Drawing Sheets

(51) Int. Cl.
  *B60W 20/12* (2016.01)
  *B60K 6/26* (2007.10)
  *B60W 10/06* (2006.01)
  *B60W 10/08* (2006.01)
  *B60W 30/18* (2012.01)
  *B60W 50/00* (2006.01)
  *B60L 7/10* (2006.01)

(52) U.S. Cl.
  CPC ..... *B60W 2520/10* (2013.01); *B60W 2555/20* (2020.02); *B60W 2710/06* (2013.01); *B60W 2710/08* (2013.01); *B60W 2710/244* (2013.01); *B60Y 2200/92* (2013.01); *B60Y 2300/18125* (2013.01)

(56) References Cited

U.S. PATENT DOCUMENTS

| | | | | |
|---|---|---|---|---|
| 2004/0230376 | A1* | 11/2004 | Ichikawa | G01C 21/26 702/2 |
| 2008/0004789 | A1* | 1/2008 | Horvitz | G01C 21/3492 701/117 |
| 2008/0073057 | A1* | 3/2008 | Kojima | B60H 1/00742 165/43 |
| 2011/0184642 | A1* | 7/2011 | Rotz | G01C 21/3469 701/533 |
| 2011/0238257 | A1* | 9/2011 | Tarnowsky | G01F 9/023 701/31.4 |
| 2012/0010767 | A1* | 1/2012 | Phillips | B60W 10/06 701/22 |
| 2012/0010768 | A1* | 1/2012 | Phillips | B60L 50/16 701/22 |
| 2013/0204525 | A1* | 8/2013 | Pfeifle | G01C 21/3492 701/533 |
| 2013/0317744 | A1* | 11/2013 | Mieth | G08G 1/0141 701/533 |
| 2014/0018985 | A1* | 1/2014 | Gupta | B60W 10/06 701/22 |
| 2014/0244130 | A1* | 8/2014 | Filev | B60K 31/00 701/96 |
| 2014/0350763 | A1* | 11/2014 | Granato | B60W 10/08 701/22 |
| 2014/0358841 | A1* | 12/2014 | Ono | G08G 1/0129 706/52 |
| 2015/0019118 | A1* | 1/2015 | Lamprecht | G06Q 10/06 701/123 |
| 2015/0073639 | A1* | 3/2015 | Minarcin | B60W 10/08 701/22 |
| 2015/0344036 | A1* | 12/2015 | Kristinsson | B60W 10/08 701/22 |
| 2018/0058868 | A1* | 3/2018 | Kang | B60W 20/12 |
| 2018/0211523 | A1 | 7/2018 | Ashida et al. | |
| 2018/0304891 | A1 | 10/2018 | Heidenreich et al. | |
| 2018/0364725 | A1* | 12/2018 | Lonari | G06Q 10/00 |
| 2019/0143963 | A1 | 5/2019 | Schlegel et al. | |
| 2019/0291733 | A1 | 9/2019 | Limbacher et al. | |
| 2020/0064139 | A1* | 2/2020 | Mieth | G08G 1/096816 |

FOREIGN PATENT DOCUMENTS

| | | | | |
|---|---|---|---|---|
| DE | 102012004258 | A1 * | 9/2013 | ........ B60W 50/0097 |
| DE | 10 2016 208675 | A1 | 11/2017 | |
| DE | 10 2016 214822 | A1 | 2/2018 | |
| EP | 0729861 | A2 | 9/1996 | |
| EP | 2 615 598 | A1 | 7/2013 | |
| JP | 2005160270 | A * | 6/2005 | |
| JP | 2007011490 | A * | 1/2007 | |
| JP | 2011-014038 | A | 1/2011 | |
| JP | 2015-074395 | A | 4/2015 | |
| JP | 2015074395 | A * | 4/2015 | ......... G01C 21/3697 |
| JP | 2017081484 | A * | 5/2017 | ............ B60W 20/11 |
| WO | WO-2009072965 | A1 * | 6/2009 | ............ B60W 30/16 |
| WO | WO-2014080802 | A1 * | 5/2014 | ............... B60K 6/48 |
| WO | 2017/033215 | A1 | 3/2017 | |
| WO | WO-2018010598 | A1 * | 1/2018 | ............ B60W 20/10 |

OTHER PUBLICATIONS

EPO machine translation of JP 2015-74395 (original JP document published Apr. 20, 2015) (Year: 2015).*

Jiao, Xiaohong et al., "Real-time energy management based on ECMS with stochastic optimized adaptive equivalence factors for HEVs", Cogent Engineering, vol. 5 No. 1, Nov. 1, 2018, published online Nov. 11, 2018, Paper 1540027, 19 pages (Year: 2018).*

Wikipedia article, "Expected value", Old revision dated Oct. 17, 2018, 30 pages (Year: 2018).*

Zhang et al; "A fast Bayesian approach using adaptive densifying approximation technique accelerated MCMC;" Inverse Problems in Science and Engineering; pp. 247-264; 2016; vol. 24, No. 2.

* cited by examiner

PROBABILITY DISTRIBUTION OF
VEHICLE SPEED WITH RESPECT TO DRIVING SECTIONS

CONTROL DEVICE OF VEHICLE

FIELD

The present invention relates to a control device of a vehicle.

BACKGROUND

In the past, it has been known to predict a predetermined parameter relating to driving of a vehicle and use the predicted value of the parameter to control the vehicle (for example PTL 1).

In a hybrid vehicle provided with an internal combustion engine and a motor as sources of power able to output power for driving, the EV mode and HV mode can be selected as the driving mode. In the EV mode, power for driving is output by only the motor, while in the HV mode, power for driving is output by the internal combustion engine and motor. In the EV mode, the internal combustion engine is stopped, so it is possible to select the EV mode as the driving mode to improve the fuel efficiency of the hybrid vehicle.

However, if the amount of stored power of the battery is insufficient, the EV mode cannot be selected as the driving mode. For this reason, if driving the vehicle for a long time without charging the battery, it is necessary to jointly use the EV mode and HV mode as the driving mode.

CITATIONS LIST

Patent Literature

[PTL 1] Japanese Unexamined Patent Publication No. 2015-074395

SUMMARY

Technical Problem

If a vehicle is driven from a current position to a destination, the driving modes in the different driving sections of the driving route are preferably selected so that the amount of fuel consumption becomes the smallest. For this reason, it may be considered to calculate an evaluation value such as an amount of fuel consumption or an amount of electric power consumption based on the predicted values of the vehicle speeds at the driving sections and select the driving modes so that the evaluation value becomes optimal.

In this connection, in the control device of the vehicle described in PTL 1, the value of the vehicle speed at the maximum probability in the probability distribution generated in advance is used as the predicted value of the vehicle speed. However, the actual vehicle speed will not necessarily match the value at the maximum probability in the probability distribution. If the driving mode is selected so that the evaluation value calculated based on an erroneous predicted value becomes optimum, the fuel efficiency of the vehicle etc., are liable to deteriorate.

Therefore, considering the above technical issue, the object of the present invention is to improve the precision of prediction of an evaluation value used in control of a vehicle.

Solution to Problem

The summary of the present disclosure is as follows.

(1) A control device of a vehicle comprising a vehicle control part configured to use a probability distribution of at least one predetermined parameter to calculate an expected value of each of at least one evaluation value and control the vehicle based on the expected value.

(2) The control device of a vehicle described in above (1), further comprising a driving data acquiring device acquiring the at least one predetermined parameter as driving data and a probability distribution generating part configured to generate the probability distribution based on the driving data acquired by the driving data acquiring device.

(3) The control device of a vehicle described in above (2), wherein the probability distribution generating part is provided at an outside of the vehicle and is configured to receive the driving data from driving data acquiring devices provided at the plurality of vehicles.

(4) The control device of a vehicle described in any one of above (1) to (3), wherein the at least one predetermined parameter is a vehicle speed.

(5) The control device of a vehicle described in above (4), wherein the vehicle comprises an internal combustion engine and a motor able to output power for driving and a battery supplying electric power to the motor and able to be charged by an external power supply, the at least one evaluation value is an amount of electric power consumption when the vehicle is being driven over a driving route from a current position to a destination or an amount of electric power consumption and an amount of fuel consumption when the vehicle is being driven over the driving route, and the vehicle control part is configured to select the driving mode of the vehicle at each driving section of the driving route based on the expected value of each of the at least one evaluation value.

(6) The control device of a vehicle described in above (4), wherein the at least one evaluation value is a time of arrival of the vehicle at a destination, and the vehicle control part configured to set a target value of a vehicle speed based on the expected value each of the at least one evaluation value.

(7) The control device of a vehicle described in any one of above (1) to (3), wherein the vehicle comprises a generator able to use regenerated energy to generate regenerated electric power at the time of braking of the vehicle and a battery to which the regenerated electric power generated by the generator is supplied, the at least one predetermined parameter is a brake pressure, while the at least one evaluation value is an amount of loss of the regenerated electric power, and the vehicle control part is configured to set the target value of the vehicle speed based on the expected value of each of the at least one evaluation value.

(8) The control device of a vehicle described in any one of above (1) to (3), wherein the vehicle comprises an internal combustion engine and a motor able to output power for driving, a battery supplying electric power to the motor and able to be charged by an external power supply, and an air-conditioner, the at least one predetermined parameter is a combination of an outside air temperature and an outside air humidity or the outside air temperature, and the at least one evaluation value is an electric power consumed by the air-conditioner in a predetermined time period in the future, and the vehicle control part is configured to control a state of charge of the battery based on the expected value of each of the at least one evaluation value.

(9) The control device of a vehicle described in any one of above (1) to (3), wherein the vehicle comprises an internal combustion engine and a motor able to output power for driving, a battery supplying electric power to the motor and able to be charged by an external power supply, and an air-conditioner, the at least one predetermined parameter is an outside air temperature, and the at least one evaluation value is an amount of fuel consumption for warmup in a predetermined time period in the future, and the vehicle control part is configured to select a driving mode of the vehicle based on the expected value of each of the at least one evaluation value.

(10) The control device of a vehicle described in any one of above (1) to (3), wherein the vehicle comprises an internal combustion engine and a motor able to output power for driving and a battery supplying electric power to the motor and able to be charged by an external power supply, the at least one predetermined parameter is a time of departure and an amount of electric power consumption of the battery from departure until recharging, and the at least one evaluation value is an amount of stored power of the battery at the time of departure and the amount of electric power consumption from departure until recharging, and the vehicle control part is configured to set a time of start of charging of the battery based on the expected value of each of the at least one evaluation value.

Advantageous Effects of Invention

According to the present invention, it is possible to improve the precision of prediction of an evaluation value used in control of a vehicle.

DESCRIPTION OF EMBODIMENTS

Figure 1:
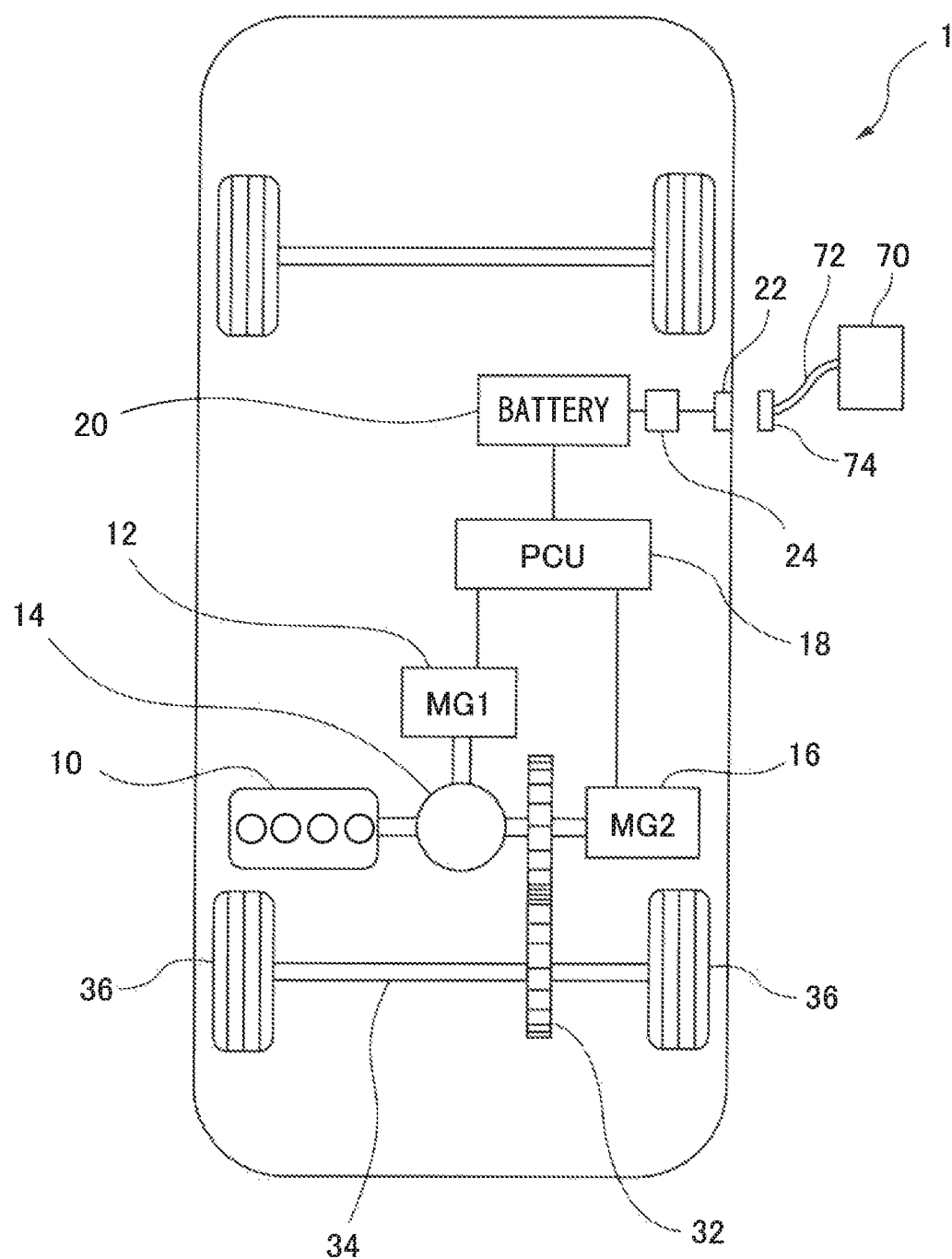
FIG. 1 is a view schematically showing a configuration of a vehicle in which a control device of a vehicle according to a first embodiment of the present invention is used.

Below, referring to the drawings, embodiments of the present invention will be explained in detail. Note that, in the following explanation, similar components are assigned the same reference signs.

First Embodiment

Below, referring to FIG. 1 to FIG. 6, a first embodiment of the present invention will be explained.

<Configuration of Vehicle>

FIG. 1 is a view schematically showing the configuration of a vehicle in which a control device of a vehicle according to the first embodiment of the present invention is used. A vehicle 1 is provided with an internal combustion engine 10, first motor-generator 12, power distributing mechanism 14, second motor-generator 16, power control unit (PCU) 18, and battery 20.

The internal combustion engine 10 burns an air-fuel mixture of fuel and air in cylinders to output power. The internal combustion engine 10, for example, is a gasoline engine or a diesel engine An output shaft of the internal combustion engine 10 (crankshaft) is mechanically connected to the power distributing mechanism 14, and output of the internal combustion engine 10 is input to the power distributing mechanism 14.

The first motor-generator 12 functions as a generator and motor. The first motor-generator 12 is mechanically connected to the power distributing mechanism 14, and the output of the first motor-generator 12 is input to the power distributing mechanism 14. Further, the first motor-generator 12 is electrically connected to the PCU 18. When the first motor-generator 12 functions as a generator, the electric power generated by the first motor-generator 12 is supplied through the PCU 18 to at least one of the second motor-generator 16 and battery 20. On the other hand, when the first motor-generator 12 functions as a motor, the electric power stored in the battery 20 is supplied through the PCU 18 to the first motor-generator 12.

The power distributing mechanism 14 is configured as a known planetary gear mechanism including a sun gear, ring gear, pinion gears, and a planetary carrier. The output shaft of the internal combustion engine 10 is coupled with the planetary carrier, the first motor-generator 12 is coupled with the sun gear, and a speed reducer 32 is coupled with the ring gear. The power distributing mechanism 14 distributes the output of the internal combustion engine 10 to the first motor-generator 12 and the speed reducer 32.

Specifically, when the first motor-generator 12 functions as a generator, the output of the internal combustion engine 10 input to the planetary carrier is distributed to the sun gear coupled with the first motor-generator 12 and the ring gear coupled with the speed reducer 32 in accordance with the gear ratio. The output of the internal combustion engine 10 distributed to the first motor-generator 12 is used to generate electric power by the first motor-generator 12. On the other hand, the output of the internal combustion engine 10 distributed to the speed reducer 32 is transmitted as power for driving through an axle 34 to the wheels 36. Therefore, the internal combustion engine 10 can output power for driving. Further, when the first motor-generator 12 functions as a motor, the output of the first motor-generator 12 is supplied through the sun gear and planetary carrier to the output shaft of the internal combustion engine 10 whereby the internal combustion engine 10 is cranked.

The second motor-generator 16 functions as a generator and motor. The second motor-generator 16 is mechanically connected to the speed reducer 32, and the output of the second motor-generator 16 is supplied to the speed reducer 32. The output of the second motor-generator 16 supplied to the speed reducer 32 is transmitted as power for driving to the wheels 36 through the axle 34. Therefore, the second motor-generator 16 can output power for driving.

Further, the second motor-generator 16 is electrically connected to the PCU 18. At the time of deceleration of the vehicle 1, due to rotation of the wheels 36, the second motor-generator 16 is driven and the second motor-generator 16 functions as a generator. As a result, so-called regeneration is performed. When the second motor-generator 16 functions as a generator, the regenerative power generated by the second motor-generator 16 using the regenerative energy is supplied through the PCU 18 to the battery 20. On the other hand, when the second motor-generator 16 functions as a motor, the power stored in the battery 20 is supplied through the PCU 18 to the second motor-generator 16.

The PCU 18 is electrically connected to the first motor-generator 12, second motor-generator 16, and battery 20. The PCU 18 includes an inverter, a booster converter, and a DC-DC converter. The inverter converts DC power supplied from the battery 20 to AC power and converts AC power generated by the first motor-generator 12 or second motor-generator 16 to DC power. The booster converter boosts the voltage of the battery 20 in accordance with need when the power stored in the battery 20 is supplied to the first motor-generator 12 or the second motor-generator 16. The DC-DC converter lowers the voltage of the battery 20 when the electric power stored in the battery 20 is supplied to the headlights or other electronic equipment.

The power generated by the first motor generator 12 using the output of the internal combustion engine 10 and the regenerative power generated by the second motor generator 16 using regenerated energy are supplied to the battery 20. Therefore, the battery 20 can be charged by the output of the internal combustion engine 10 and the regenerated energy. The battery 20, for example, is a lithium ion battery, nickel hydrogen battery, or other secondary battery.

The vehicle 1 is further provided with a charging port 22 and charger 24. The battery 20 can be charged by an external power source 70 as well. Therefore, the vehicle 1 is a so-called "plug-in hybrid vehicle (PHV)".

The charging port 22 is configured so as to receive the electric power from the external power source 70 through a charging connector 74 of a charging cable 72. When the battery 20 is charged by the external power source 70, the charging connector 74 is connected to the charging port 22. The charger 24 converts the electric power supplied from the external power source 70 to electric power which can be supplied to the battery 20. Note that, the charging port 22 may also be connected to the PCU 18, and the PCU 18 may also function as the charger 24.

Note that, the first motor-generator 12 may be a generator not functioning as a motor. Further, the second motor-generator 16 may be a motor not functioning as a generator. Further, the vehicle 1 is a so-called series-parallel type of hybrid vehicle. However, the vehicle 1 may be a so-called series type, parallel type, or other type of hybrid vehicle.

<Control Device of Vehicle>

Figure 2:
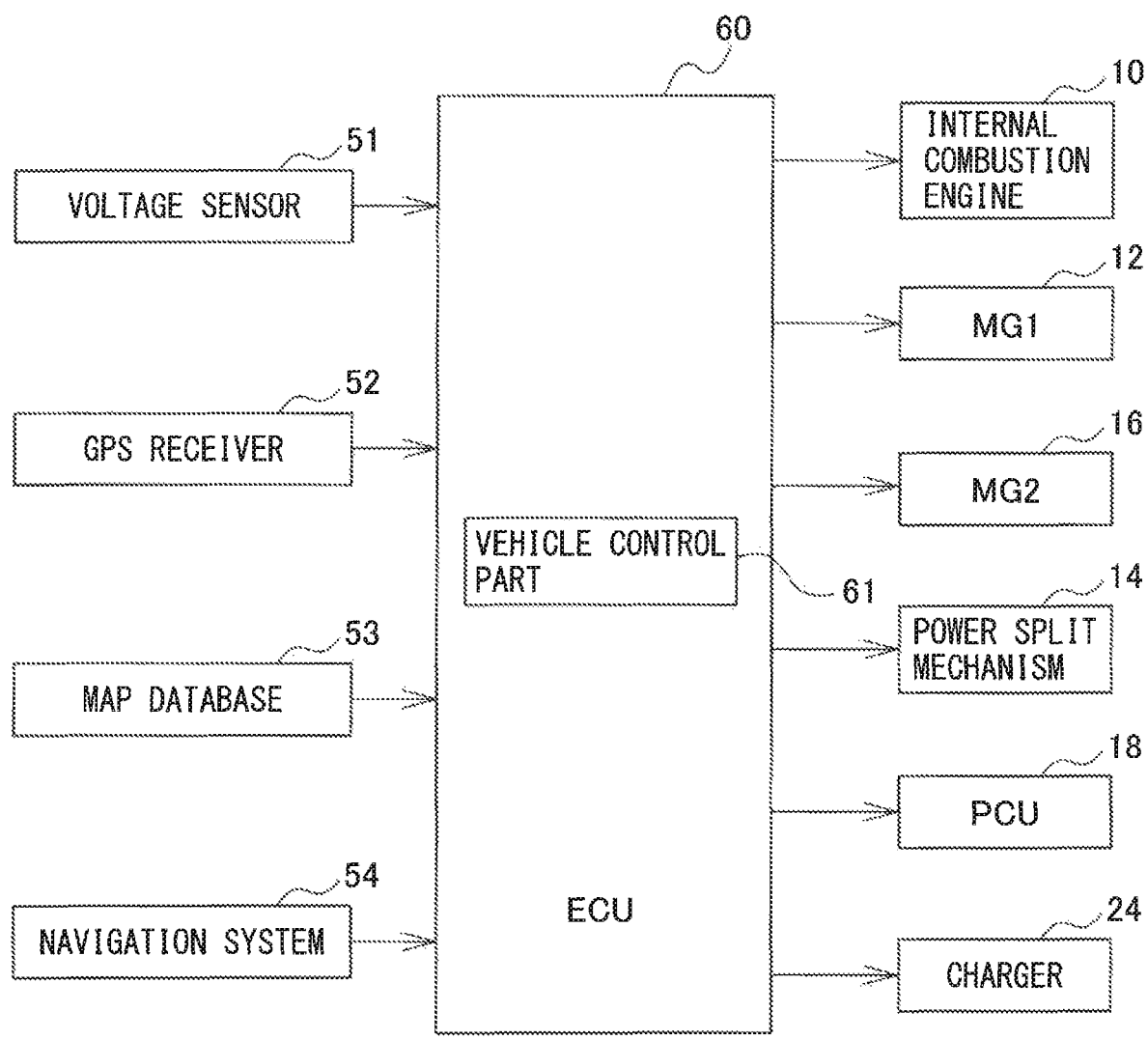
FIG. 2 is a block diagram schematically showing the configuration of the control device of the vehicle etc., according to the first embodiment of the present invention.

FIG. 2 is a block diagram schematically showing the configuration of a control device of a vehicle etc., according to the first embodiment of the present invention. The control device of the vehicle is provided with an electronic control unit (ECU) 60. The ECU 60 is provided with a read only memory (ROM) and random access memory (RAM) or other such memory, a processor, input port, output port, communication module, etc. The ECU 60 is provided at the vehicle. In the present embodiment, a single ECU 60 is provided, but a plurality of ECUs may be provided for the different functions.

The ECU 60 is connected to various sensors provided at the vehicle 1. The outputs of the various sensors are input to the ECU 60. In the present embodiment, the outputs of a voltage sensor 51 and a GPS receiver 52 are input to the ECU 60.

The voltage sensor 51 is provided at the battery 20 and detects the voltage across the electrodes of the battery 20. The voltage sensor 51 is connected to the ECU 60, so the output of the voltage sensor 51 is transmitted to the ECU 60. The ECU 60 calculates the state of charge (SOC: State Of Charge) of the battery 20 based on the output of the voltage sensor 51, etc.

The GPS receiver 52 is provided at the vehicle 1. The GPS receiver 52 receives signals from three or more GPS satellites and detects the current position of the vehicle 1 (for example, the longitude and latitude of the vehicle 1). The GPS receiver 52 is connected to the ECU 60, so the output of the GPS receiver 52 is transmitted to the ECU 60.

Further, the ECU 60 is connected to a map database 53 provided at the vehicle 1. The map database 53 is a database relating to map information. The map information includes the position information of roads, shape information of the roads (for example curved or straight types, radii of curvature of the curves, road gradients, etc.), types of roads, speed limits, and other road information. The ECU 60 acquires map information from the map database 53.

Further, the ECU 60 is connected to a navigation system 54 provided at the vehicle 1. The navigation system 54 sets a driving route of the vehicle 1 from the current position to the destination based on the output of the GPS receiver 52, the map information of the map database 53, the input by the driver, etc. The driving route set by the navigation system 54 is sent to the ECU 60. Note that, the GPS receiver 52 and map database 53 may be built into the navigation system 54.

Further, the ECU 60 is connected to the various actuators provided at the vehicle 1 and controls the various actuators. In the present embodiment, the ECU 60 is connected to the internal combustion engine 10, first motor-generator 12, second motor-generator 16, power split mechanism 14, PCU 18, and charger 24 and controls these.

In the present embodiment, the ECU 60 has a vehicle control part 61. The vehicle control part 61 is a functional block realized by a program stored in the memory of the ECU 60 being run by the processor of the ECU 60. The vehicle control part 61 uses the probability distribution of a predetermined parameter to calculate an expected value of an evaluation value and controls the vehicle 1 based on the expected value of the evaluation value.

As explained above, the vehicle 1 is provided with an internal combustion engine 10 and second motor-generator 16 as sources of power able to output power for driving. For this reason, at the vehicle 1, as the driving mode, an EV mode and HV mode can be selected.

At the EV mode, the internal combustion engine 10 is stopped and only the second motor-generator 16 is used to output power for driving. For this reason, in the EV mode, power is supplied from the battery 20 to the second motor-generator 16. As a result, in the EV mode, the amount of stored power of the battery 20 is decreased and the SOC of the battery 20 falls. Note that, a one-way clutch transmitting rotational force in only one direction may be provided at the power split mechanism 14 and in the EV mode, power for driving may be output from the first motor-generator 12 and the second motor-generator 16.

On the other hand, in the HV mode, the internal combustion engine 10 is started up and power for driving is output by the internal combustion engine 10 and the second motor-generator 16. In the HV mode, basically, the power generated by the first motor-generator 12 using the output of the internal combustion engine 10 is supplied to the second motor-generator 16 and the supply of power from the battery 20 is stopped. Note that, in the HV mode, temporarily, the battery 20 may be charged by the output of the internal combustion engine 10 or temporarily power may be supplied from the battery 20 to the second motor-generator 16. In the HV mode, the amount of stored power and the SOC of the battery 20 are maintained substantially constant. Therefore, the degree of drop of the SOC in the EV mode is larger than the degree of drop of the SOC in the HV mode.

In the HV mode, fuel is consumed in the internal combustion engine 10, while in the EV mode, fuel is not consumed in the internal combustion engine 10. For this reason, to improve the fuel efficiency of the vehicle 1, it is preferable to maintain the driving mode in the EV mode as much as possible. However, if the amount of stored power of the battery 20 is insufficient, it is not possible to select the EV mode as the driving mode. For this reason, if driving the vehicle 1 for a long period of time without charging the battery 20 by the external power supply 70, it is necessary to jointly use the EV mode and HV mode as the driving mode.

When the vehicle 1 is driven over a driving route from the current position to the destination (below, simply referred to as the "driving route"), the amount of electric power which can be consumed for driving is limited by the amount of stored power of the battery 20 at the time of departure. To improve the fuel efficiency of the vehicle 1, the driving mode is preferably selected so that the amount of fuel consumption when the vehicle 1 is being driven over the driving route becomes minimum under this restriction.

The amount of electric power consumption and amount of fuel consumption fluctuate in accordance with the road gradient and vehicle speed (speed of the vehicle 1) at the time of driving. For this reason, the amount of electric power consumption and the amount of fuel consumption are expressed as functions of the road gradient and vehicle speed. Further, the electric power stored in the battery 20 is consumed in the EV mode and is not consumed in the HV mode. On the other hand, in the EV mode, the internal combustion engine 10 is stopped, while in the HV mode, fuel is consumed in the internal combustion engine 10.

For this reason, if the driving route is divided into a plurality of driving sections, the amount of electric power consumption $E_k$ at a driving section "k" is expressed by the following equation (1):

$$E_k = e(x_k, v_k) \times u_k \quad (1)$$

Further, the amount of fuel consumption $F_k$ at a driving section "k" is expressed by the following equation (2):

$$F_k = f(x_k, v_k) \times (1 - u_k) \quad (2)$$

Here, "e" is a function for calculating the amount of electric power consumption based on the road gradient and vehicle speed and has the road gradient $x_k$ and vehicle speed $v_k$ at a driving section "k" as variables, "f" is a function for calculating the amount of fuel consumption based on the road gradient and vehicle speed and has the road gradient $x_k$ and vehicle speed $v_k$ at a driving section "k" as variables.

Further, $u_k$ shows the driving mode at a driving section "k". In the EV mode, it is set to "1", while in the HV mode, it is set to "0". For this reason, as clear from the above equations (1) and (2), the amount of electric power consumption $E_k$ becomes 0 at the HV mode and the amount of fuel consumption $F_k$ becomes 0 at the EV mode.

By cumulatively adding the amounts of electric power consumption at all of the driving sections of a driving route, it is possible to calculate the amount of electric power consumption when the vehicle 1 is being driven aver the driving route (below, referred to as the "total amount of electric power consumption"). Similarly, by cumulatively adding the amounts of fuel consumption at all of the driving sections of a driving route, it is possible to calculate the amount of fuel consumption when the vehicle 1 is being driven over the driving route (below, referred to as the "total amount of fuel consumption"). Therefore, if the road gradient and vehicle speed at each driving section are known, it is possible to predict the total amount of electric power consumption and total amount of fuel consumption when changing the driving mode at each driving section.

The road gradients are stored in advance in the map database 53 for the different driving sections. On the other hand, a vehicle speed differs from a road gradient and fluctuates in accordance with a state of congestion of a road etc. For this reason, the vehicle speed corresponding to each driving section can conceivably be predicted probabilistically based on past driving data. For example, the probability distribution of the vehicle speed for a predetermined driving section is generated as follows using past driving data:

TABLE I

| | Vehicle speed (km/h) | | | | |
|---|---|---|---|---|---|
| | 0 to 20 | 20 to 40 | 40 to 60 | 60 to 80 | 80 to 100 |
| Probability (%) | 5 | 30 | 50 | 10 | 5 |

In this case, the probability becomes maximum in a speed class of 40 to 60 km/h. The average vehicle speed of this speed class is 50 km/h. For this reason, if the vehicle speed at the maximum probability in the probability distribution is used as the predicted value, the predicted value of the vehicle speed at the driving section becomes 50 km/h. However, according to the above probability distribution, this prediction will be wrong with a probability of 50%. For this reason, if using the thus predicted vehicle speed to predict the amount of electric power consumption and the amount of fuel consumption at each driving section, a large discrepancy is liable to be generated between the predicted value and the actual value.

Figure 3:
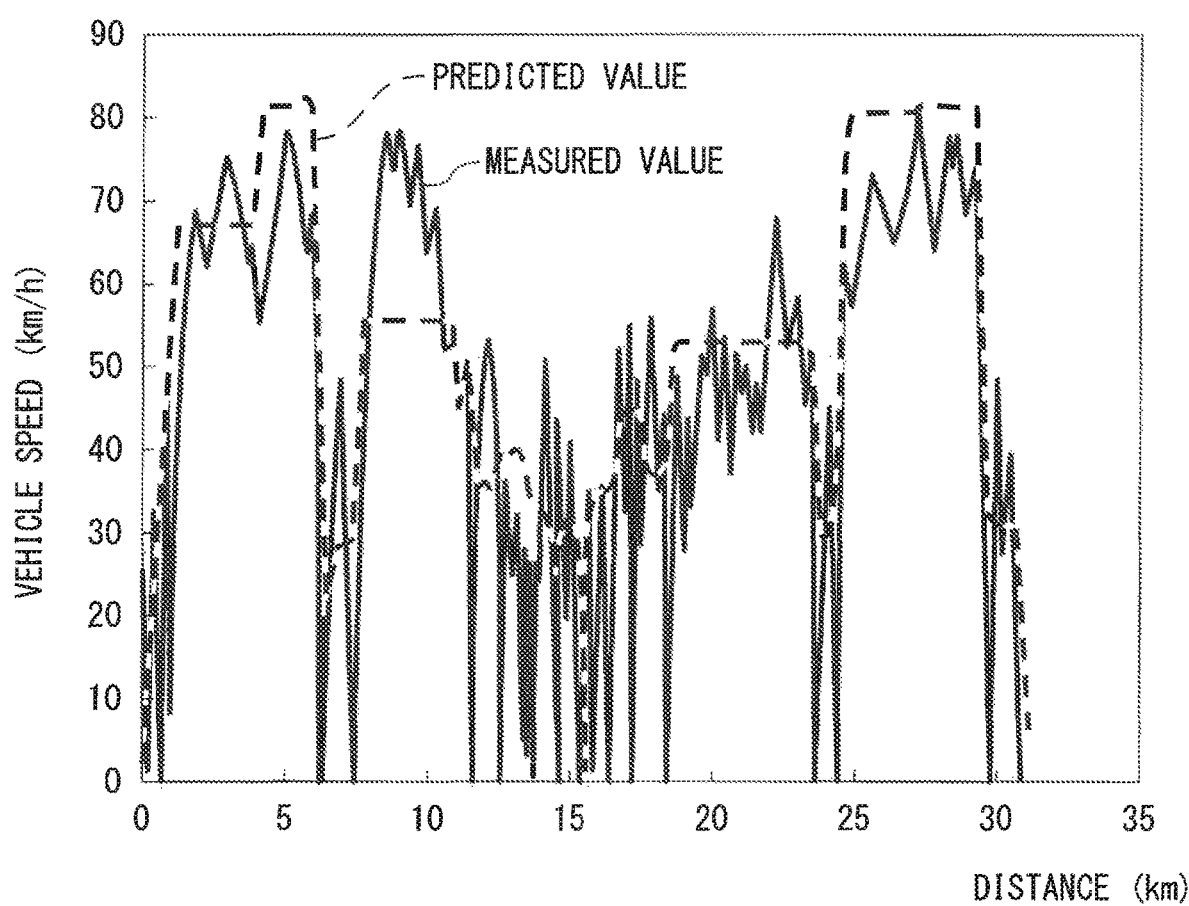
FIG. 3 is a view showing measurement data of the vehicle speed on a predetermined driving route.

FIG. 3 is a view showing measurement data of the vehicle speed on a predetermined driving route. In this figure, a driving position is shown as a distance from the current position. Further, the actual vehicle speed is shown by the solid line, while the predicted value of the vehicle speed is shown as a broken line. In the example of FIG. 3, as the predicted value of the vehicle speed, the value at the maximum probability in the probability distribution is used. As a result, in the example of FIG. 3, in particular, at the driving position near 8 to 11 km, a large discrepancy is generated between the predicted value and the actual value. Therefore, there is room for improvement in calculation of a predicted value using probability distribution.

Therefore, in the present embodiment, the vehicle control part 61 uses the probability distribution of a predetermined parameter to calculate an expected value of an evaluation value and controls the vehicle 1 based on the expected value of the evaluation value. By doing this, variation in the probability distribution is also considered in calculation of the evaluation value, so it is possible to improve the precision of prediction of the evaluation value. As a result, the control performed in the vehicle can be optimized.

Figure 4:
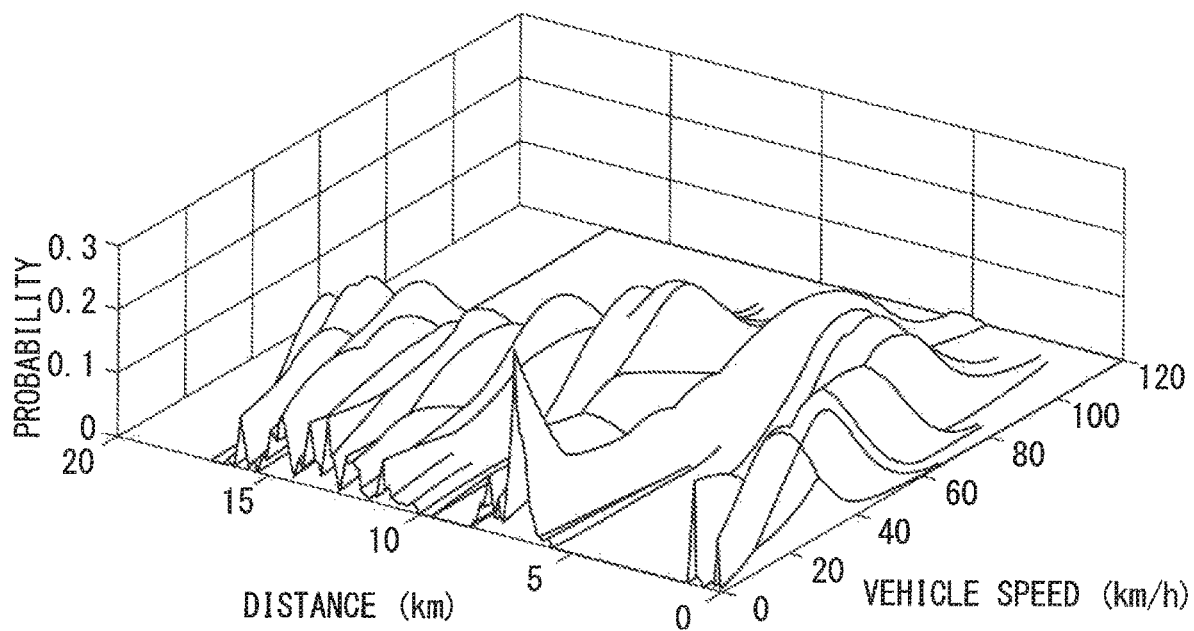
FIG. 4 is a view showing one example of the probability distribution of vehicle speeds at different driving sections.

In the present embodiment, the predetermined parameter is the vehicle speed, and the evaluation values are the total amount of electric power consumption and the total amount of fuel consumption. In this case, the vehicle control part 61 uses the probability distribution of the vehicle speed for each driving section to calculate the expected values of the total amount of electric power consumption and total amount of fuel consumption. FIG. 4 is a view showing one example of the probability distribution of the vehicle speed for the different driving sections. In this figure, each driving section is shown as a distance from the current position.

The probability distribution such as shown in FIG. 4 is stored in the memory of the ECU 60 as a three-dimensional map showing the probability corresponding to a driving section and vehicle speed. Each driving section is determined based on the distance, position of intersections, road. ID included in the map information of the map database 53, etc. Each driving section is given an identification label for identifying the driving section.

The vehicle control part 61 predicts the driving route of the vehicle 1 and uses the probability distribution of the vehicle speed for the different driving sections of the driving route to calculate the expected values of the total amount of electric power consumption and the total amount of fuel consumption. Specifically, the vehicle control part 61 uses the following equation (3) to calculate the expected value $E_e$ of the total amount of electric power consumption:

[Equation 1]

$$E_e = \sum_k \sum_v P_{vk} e(x_k, v) \times u_k \tag{3}$$

The following equation (4) is a part of the right side of the above equation (3) and corresponds to the expected value $E_{ke}$ of the amount of electric power consumption at a driving section "k":

[Equation 2]

$$E_{ke} = \sum_v P_{vk} e(x_k, v) \times u_k \tag{4}$$

Here, $P_{vk}$ is the probability of the vehicle speed becoming "v" at a driving section "k" and is acquired from the probability distribution of the vehicle speed for the driving section "k". As will be understood from the above equation (4), the expected value $E_{ke}$ of the amount of electric power consumption at the driving section "k" is calculated by cumulatively adding the values obtained by multiplying the probabilities $P_{vk}$ corresponding to the different vehicle speeds "v" with the amount of electric power consumption $(e(x_k, v) \times u_k)$ calculated by the above equation (1) using the different vehicle speeds "v". The number of vehicle speeds "v" cumulatively added becomes the number of speed classes in the probability distribution of the vehicle speed (in the above Table 1, five). Further, as the value of the vehicle speed "v", the average value of each speed class is used. Note that, the vehicle speed "v" may be a continuous value such as shown in FIG. 4.

Therefore, as will be understood from the above equation (3), the vehicle control part 61 cumulatively adds the expected values $E_{ke}$ of the amounts of electric power consumption at the driving sections "k" to calculate the expected value $E_e$ of total amount of electric power consumption. The number of driving sections "k" which are cumulatively added becomes the number of the driving sections on the driving route.

Further, the vehicle control part 61 uses the following equation (5) to calculate the expected value $F_e$ of total amount of fuel consumption:

[Equation 3]

$$F_e = \sum_k \sum_v P_{vk} f(x_k, v) \times (1 - u_k) \tag{5}$$

The following equation (6) is a part of the right side of the above equation (5) and corresponds to the expected value $F_{ke}$ of the amount of fuel consumption at a driving section "k".

[Equation 4]

$$F_{ke} = \sum_v P_{vk} f(x_k, v) \times (1 - u_k) \tag{6}$$

Here, $P_{vk}$ is the probability of the vehicle speed becoming "v" in a driving section "k" and is acquired from the probability distribution of the vehicle speed with respect to the driving sections "k". As will be understood from the above equation (6), the expected value $F_{ke}$ of the amount of fuel consumption at a driving section "k" is calculated by cumulatively adding the values obtained by multiplying the probabilities $P_{vk}$ corresponding to the different vehicle speeds "v" with the amounts of fuel consumption $(f(x_k, v_k) \times (1-u_k))$ calculated by the above equation (2) using the different vehicle speeds "v". The number of vehicle speeds "v" which are cumulatively added becomes the number of speed classes in the probability distribution (in the above Table 1, five). Further, as the value of the vehicle speed "v", the average value of each speed class is used. Note that, the vehicle speed "v" may be a continuous value such as shown in FIG. 4.

Therefore, as will be understood from the above equation (5), the vehicle control part. 61 cumulatively adds the expected values $F_{ke}$ of the amounts of fuel consumption at the driving sections "k" to calculate the expected value $F_e$ of total amount of fuel consumption. The number of driving sections "k" which are cumulatively added becomes the number of the driving sections on the driving route.

Further, the vehicle control part 61 selects the driving mode of the vehicle 1 based on the expected value of the total amount of electric power consumption and the expected value of the total amount of fuel consumption. Specifically, the vehicle control part 61 selects the driving mode of the vehicle 1 at each driving section of a driving route so that the expected value of the total amount of electric power consumption satisfies a restricting condition and so that the expected value of the total amount of fuel consumption becomes the minimum. By doing this, the driving mode is optimized, and the fuel efficiency when the vehicle 1 is being driven over the driving route can be improved.

Specifically, the vehicle control part 61 calculates the $u_k$ at the above equations (3) and (5) so that the expected value of the total amount of electric power consumption satisfies the restricting condition and so that the expected value of the total amount of fuel consumption becomes the minimum. Note that, $u_k$ shows the driving mode at a driving section "k" and is set for each driving section of a driving mute.

The restricting condition is defined by the following equation (7). That is, the restricting condition is the expected value $E_e$ of the total amount of electric power consumption becoming equal to or less than the amount of electric power left $E_{left}$ of the battery 20. The remaining amount of electric power $E_{left}$ of the battery 20 is calculated based on the output of the voltage sensor 51 etc.

$$E_e \leq E_{left} \qquad (7)$$

Note that, the restricting condition may be defined by the following equation (8). That is, the restricting condition may be the expected value $E_e$ of the total amount of electric power consumption becoming equal to or less than the value of the remaining amount of electric power $E_{left}$ of the battery 20 minus a predetermined value $\alpha$ ($\alpha > 0$).

$$E_e \leq E_{left} - \alpha \qquad (8)$$

Further, the restricting condition may be defined by the following equation (9): That is, the restricting condition may be the expected value $E_e$ of the total amount of electric power consumption becoming equal to or less than the value of the remaining amount of electric power $E_{left}$ of the battery 20 multiplied with a predetermined value $\beta (0 < \beta < 1)$.

$$E_e \leq E_{left} \times \beta \qquad (9)$$

<Processing for Selecting Driving Mode>

Figure 5:
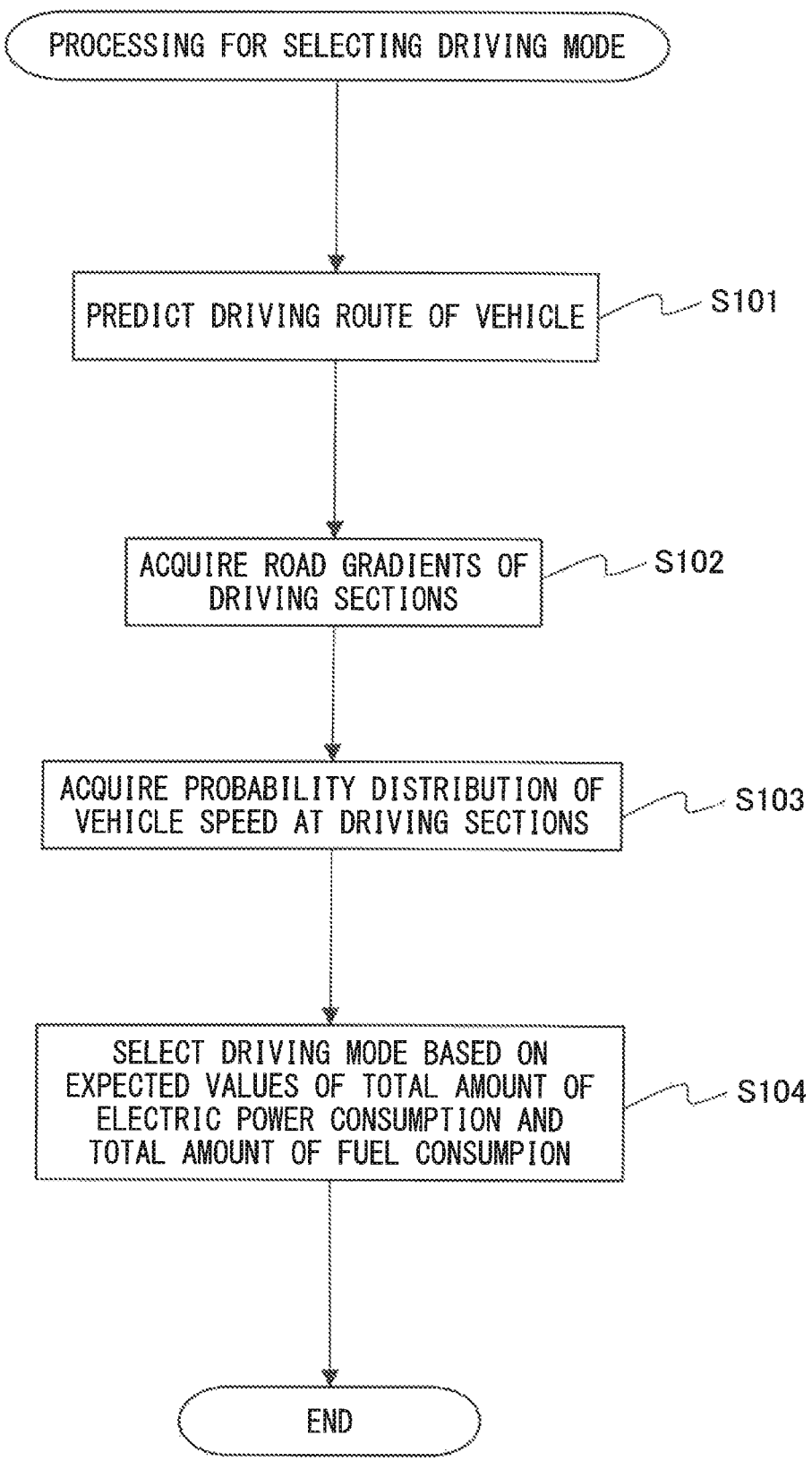
FIG. 5 is a flow chart showing a control routine of processing for selecting a driving mode in the first embodiment of the present invention.

FIG. 5 is a flow chart showing the control routine of processing for selecting a driving mode in the first embodiment of the present invention. The present control routine is repeatedly performed by the ECU 60.

First, at step S101, the vehicle control part 61 predicts the driving route of the vehicle 1 and identifies all of the driving sections of the driving route. If the driving route is set by the navigation system 54, the vehicle control part 61 acquires the driving route from the navigation system 54.

Note that, the vehicle control part 61 may predict the driving route of the vehicle 1 from the current position of the vehicle 1, the current time, etc., based on the past driving data of the vehicle 1 stored in the memory of the ECU 60. The current position of the vehicle 1 is detected by the GPS receiver 52. The current time is detected by a digital clock built in the ECU 60 or by receiving information from outside the vehicle 1 through a vehicle-mounted communicating device. In this case, the navigation system 54 may be omitted from the vehicle 1.

Next, at step S102, the vehicle control part 61 acquires the road gradients of the driving sections of the driving route from the map database 53. Next, at step S103, the vehicle control part 61 acquires the probability distribution of the vehicle speed for the driving sections of the driving route from the memory of the ECU 60.

Next, at step S104, the vehicle control part 61 uses the probability distribution of the vehicle speed for the driving sections and the road gradients of the driving sections to calculate the expected values of the total amount of electric power consumption and the total amount of fuel consumption. Further, the vehicle control part 61 selects the driving mode of the vehicle 1 at each driving section of the driving route based on the expected values of the total amount of electric power consumption and the total amount of fuel consumption. Specifically, the vehicle control part 61 selects the driving mode of the vehicle 1 at each driving section of the driving route so that the expected value of the total amount of electric power consumption satisfies the restricting condition and so that the expected value of the total amount of fuel consumption becomes the minimum. After step S104, the present control routine ends.

Note that, at step S104, the vehicle control part 61 may calculate the expected value of the total amount of electric power consumption and select the driving mode of the vehicle 1 at each driving section of the driving route based on the expected value of the total amount of electric power consumption. For example, the vehicle control part 61 may successively select the EV mode as the driving mode in order from the driving section with the smallest amount of electric power consumption so that the expected value of the total amount of electric power consumption satisfies the restricting condition. By doing this, it is possible to increase the ratio of the driving sections for which the EV mode is selected as the driving mode and possible to improve the fuel efficiency of the vehicle 1.

Further, the function "e" for calculating the amount of electric power consumption and the function "f" for calculating the amount of fuel consumption may have only the vehicle speed as a variable. That is, the vehicle control part 61 may use only the probability distribution of the vehicle speed for the driving sections to calculate the expected values of the total amount of electric power consumption and total amount of fuel consumption. In this case, step S102 is omitted.

<Vehicle Control>

Figure 6:
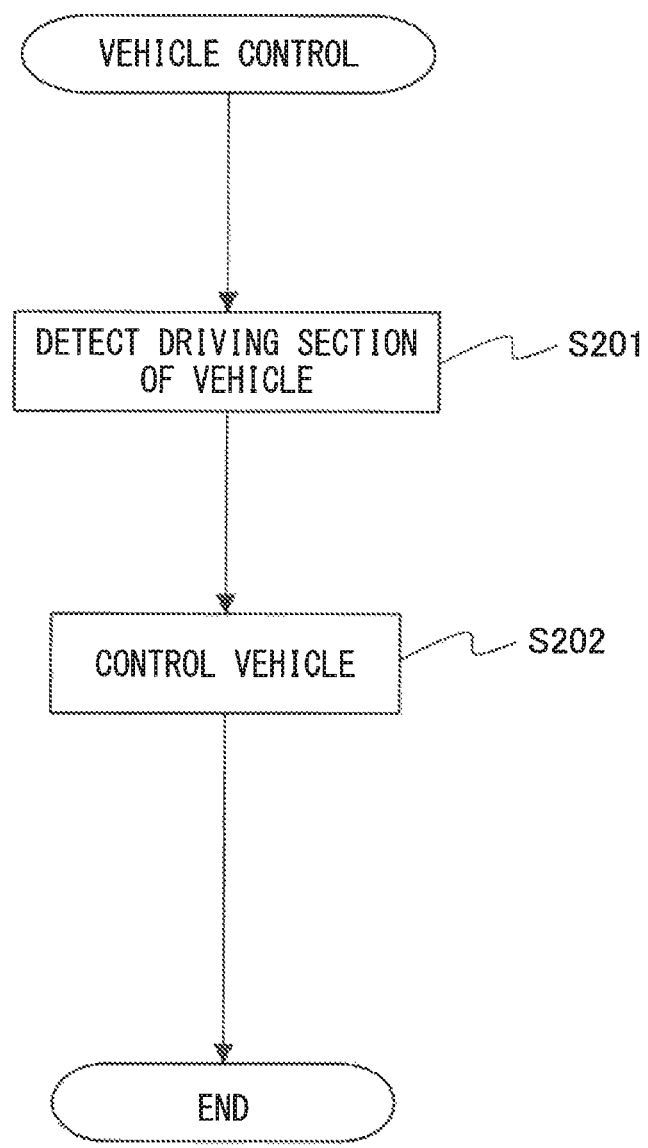
FIG. 6 is a flow chart showing the control routine of vehicle control in the first embodiment of the present invention.

FIG. 6 is a flow chart showing the control routine of vehicle control in the first embodiment of the present invention. The present control routine is repeatedly performed by the ECU 60.

First, at step S201, the vehicle control part 61 detects the current driving section of the vehicle 1 based on the output of the GPS receiver 52 and the map information of the map database 53.

Next, at step S202, the vehicle control part 61 controls the vehicle 1 based on the driving mode selected for each driving section in the control routine of FIG. 5. Specifically, the vehicle control part 61 stops the internal combustion engine 10 in the EV mode and operates the internal combustion engine 10 in the HV mode. Further, the vehicle control part 61 supplies electric power from the battery 20 to the second motor-generator 16 or the first motor-generator 12 and the second motor-generator 16 in the EV mode. After step S202, the present control routine ends.

Second Embodiment

The control device of a vehicle according to a second embodiment is basically similar in configuration and control of the control device of the vehicle according to the first embodiment except for the points explained below. For this reason, below, the second embodiment of the present invention will be explained focusing on the parts different from the first embodiment.

Figure 7:
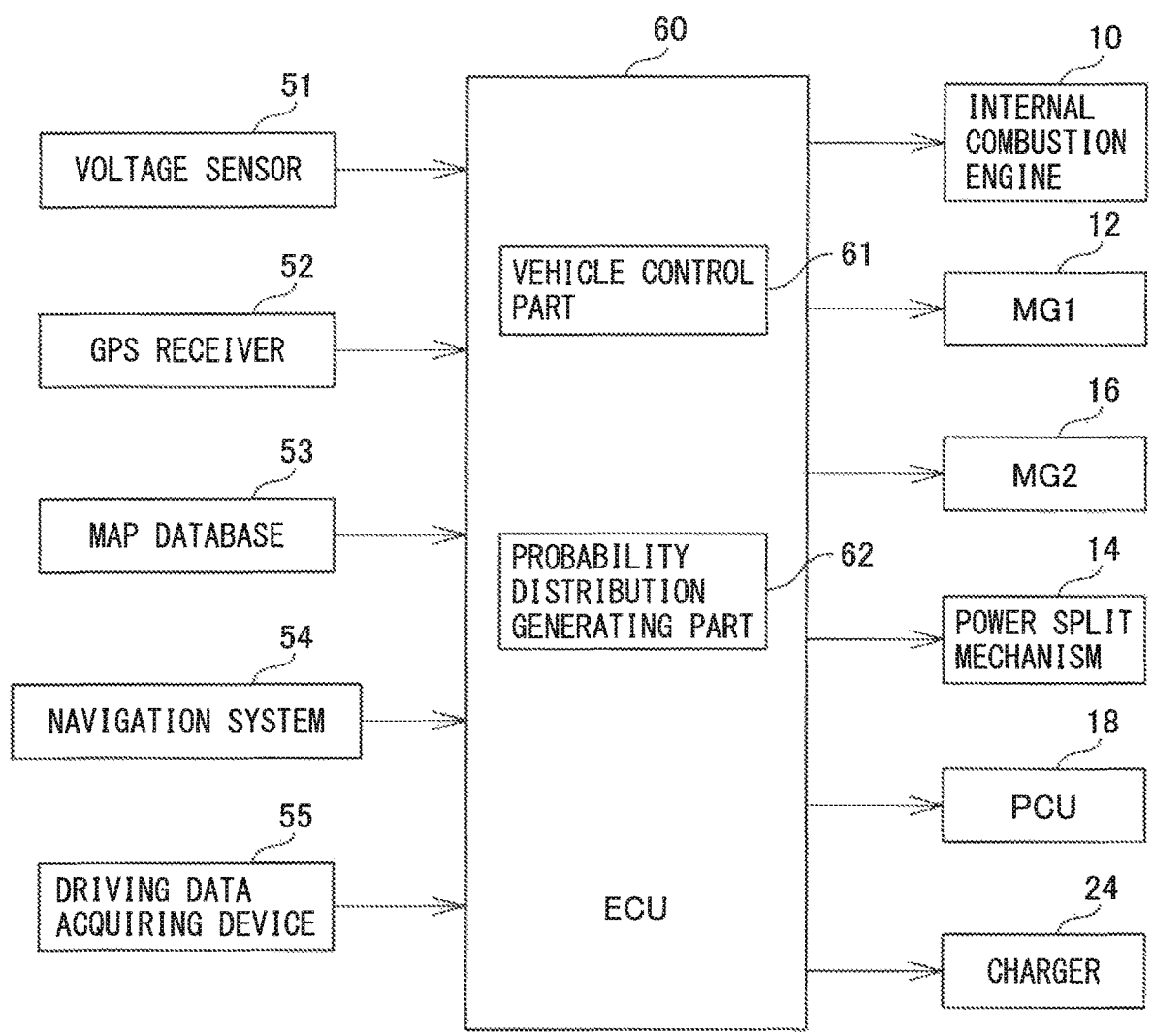
FIG. 7 is a block diagram schematically showing the configuration of a control device of a vehicle etc., according to a second embodiment of the present invention.

FIG. 7 is a block diagram schematically showing the configuration of the control device of the vehicle according to the second embodiment of the present invention. In the second embodiment, the ECU 60 is connected to a driving data acquiring device 55 in addition to the voltage sensor 51, GPS receiver 52, map database 53, and navigation system 54.

The driving data acquiring device 55 is provided at the vehicle 1 and acquires a predetermined parameter as driving data. The driving data acquiring device 55 is connected to the ECU 60. The output of the driving data acquiring device 55 is sent to the ECU 60.

Further, in the second embodiment, the ECU 60 has a probability distribution generating part 62 in addition to the vehicle control part 61. The vehicle control part 61 and probability distribution generating part 62 are respectively functional blocks realized by a program stored in the memory of the ECU 60 being run by the processor of the ECU 60.

The probability distribution generating part 62 generates the probability distribution of a predetermined parameter based on the driving data acquired by the driving data acquiring device 55. By doing this, in the second embodiment, a probability distribution in which a trend in the vehicle 1 is reflected can be efficiently generated using the vehicle 1. In this case, it is not necessary to load probability distribution generated in advance in the ECU 60 at the manufacturing factory etc.

If the predetermined parameter for which the probability distribution is generated is the vehicle speed, the driving data acquiring device 55, for example, includes a vehicle speed sensor detecting the vehicle speed. In this case, the driving data acquiring device 55 acquires the vehicle speed during driving of the vehicle 1 as the driving data. Further, the probability distribution generating part 62 generates the probability distribution of the vehicle speed for the driving sections based on the vehicle speed acquired by the driving data acquiring device 55. The driving section when the vehicle speed is acquired by the driving data acquiring device 55 is detected based on the output of the GPS receiver 52 and the map information of the map database 53. The probability distribution generated by the probability distribution generating part 62 is stored in the memory of the ECU 60.

Third Embodiment

The control device of a vehicle according to a third embodiment is basically similar in configuration and control to the control device of the vehicle according to the second embodiment except for the points explained below. For this reason, below, the third embodiment of the present invention will be explained focusing on the parts different from the second embodiment.

Figure 8:
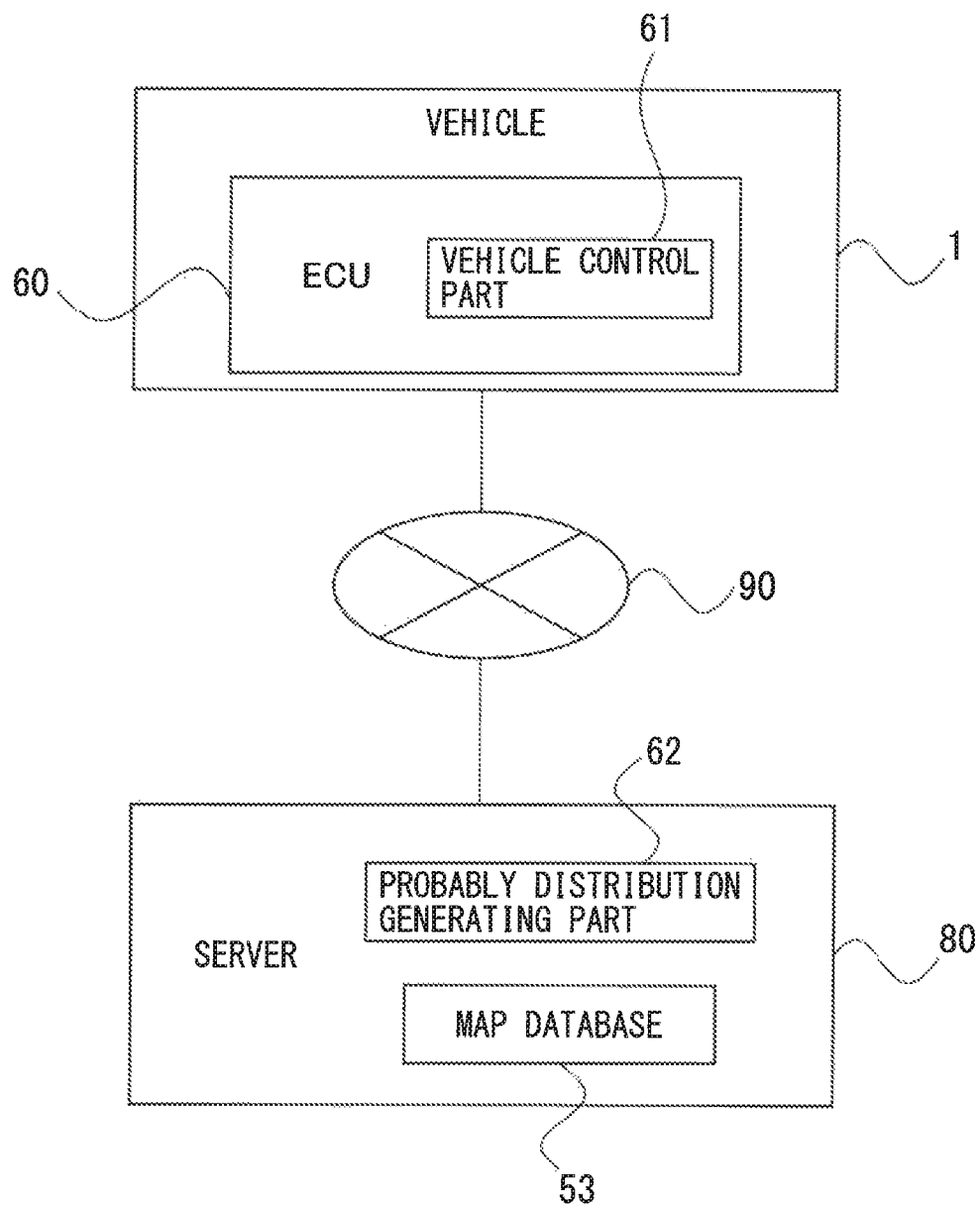
FIG. 8 is a view schematically showing the configuration of a control device of a vehicle according to a third embodiment of the present invention.

FIG. 8 is a view schematically showing the configuration of the control device of the vehicle according to the third embodiment of the present invention. In the third embodiment, the control device of the vehicle is provided with an ECU 60 provided at the vehicle 1 and a server 80 provided at the outside of the vehicle 1. The ECU 60 and the server 80 are respectively provided with communication modules and can communicate with each other through the network 90.

The server 80 is provided with, in addition to a communication module, a hard disk and random access memory (RAM) or other such storage device, processor, etc. Further, in the third embodiment, instead of the vehicle 1, the server 80 is provided with the map database 53.

The server 80 has a probability distribution generating part 62. The probability distribution generating part 62 is a functional block realized by the processor of the server 80 running a program stored in the storage device of the server 80.

The probability distribution generating part 62 receives driving data acquired by the driving data acquiring device 55 provided at the vehicle 1 from the driving data acquiring device 55. Further, in the same way as the second embodiment, the probability distribution generating part 62 generates the probability distribution of a predetermined parameter based on the driving data acquired by the driving data acquiring device 55. The probability distribution generated by the probability distribution generating part 62 is sent to the ECU 60 and stored in the memory of the ECU 60.

In the third embodiment, instead of the ECU 60 of the vehicle 1, the server 80 is used to generate the probability distribution. For this reason, the processing load of the ECU 60 can be reduced and in turn the manufacturing costs of the ECU 60 can be reduced.

Note that, the server 80 can communicate with a plurality of vehicles. In this case, the probability distribution generating part 62 receives the driving data acquired by the driving data acquiring devices 55 provided at the plurality of vehicles. By doing this, the big data can be used to efficiently generate the probability distribution of a predetermined parameter. As a result, for example, the number of the driving sections for which the probability distribution of the vehicle speed is generated can be increased.

Further, the server 80 may have the vehicle control part 61 and probability distribution generating part 62. By doing this, the processing load of the ECU 60 can be reduced more.

Fourth Embodiment

The control device of a vehicle according to a fourth embodiment is basically similar in configuration and control to the control device of the vehicle according to the first embodiment except for the points explained below. For this reason, below, the fourth embodiment of the present invention will be explained focusing on the parts different from the first embodiment.

In the fourth embodiment, the vehicle control part 61 predicts the driving route of the vehicle 1 and uses the probability distribution of the vehicle speed for the driving sections of the driving route to calculate the expected value of the time of arrival of the vehicle 1 at the destination. Further, the vehicle control part 61 sets the target value of the vehicle speed based on the expected value of the time of arrival at the destination. For example, the vehicle control part 61 raises the target value of the vehicle speed if the expected value of the time of arrival at the destination is later than a set time. By doing this, it is possible to keep the time of arrival from becoming later than the set time.

Specifically, the vehicle control part 61 uses the following equation (10) to calculate the expected value AT at the time of arrival at the destination:

[Equation 5]

$$AT = \sum_k \sum_v P_{vk}(d_k/v) + PT \qquad (10)$$

The following equation (11) is a part of the right side of the above equation (10) and corresponds to the expected value $T_{ke}$ of the required driving time at a driving section "k":

[Equation 6]

$$T_{ke} = \sum_v P_{vk}(d_k/v) \qquad (11)$$

Here, $P_{vk}$ is the probability of the vehicle speed becoming "v" at a driving section "k" and is acquired from the probability distribution of the vehicle speed for the driving section "k". As will be understood from the above equation (11), the expected value $T_{ke}$ of the required driving time at the driving section "k" is calculated by cumulatively adding the values obtained by multiplying the probabilities $P_{vk}$ corresponding to the different vehicle speeds "v" with the values obtained by dividing the distances $d_k$ of the driving sections "k" by the different vehicle speeds "v". The distances $d_k$ of the driving sections "k" are stored in the map database 53. The number of vehicle speeds "v" which are cumulatively added becomes the number of speed classes in the probability distribution (in the above Table 1, five). Further, as the value of the vehicle speed "v", the average value of each speed class is used. Note that, the vehicle speed "v" may be a continuous value such as shown in FIG. 4.

Therefore, as will be understood from the above equation (10), the vehicle control part 61 adds the current time PT to the value obtained by cumulatively adding the expected values $T_{ke}$ of required driving times at the driving sections "k" to thereby calculate the expected value AT of the time of arrival at the destination. The number of driving sections "k" which are cumulatively added becomes the number of driving sections of the driving route.

<Processing for Setting Vehicle Speed>

Figure 9:
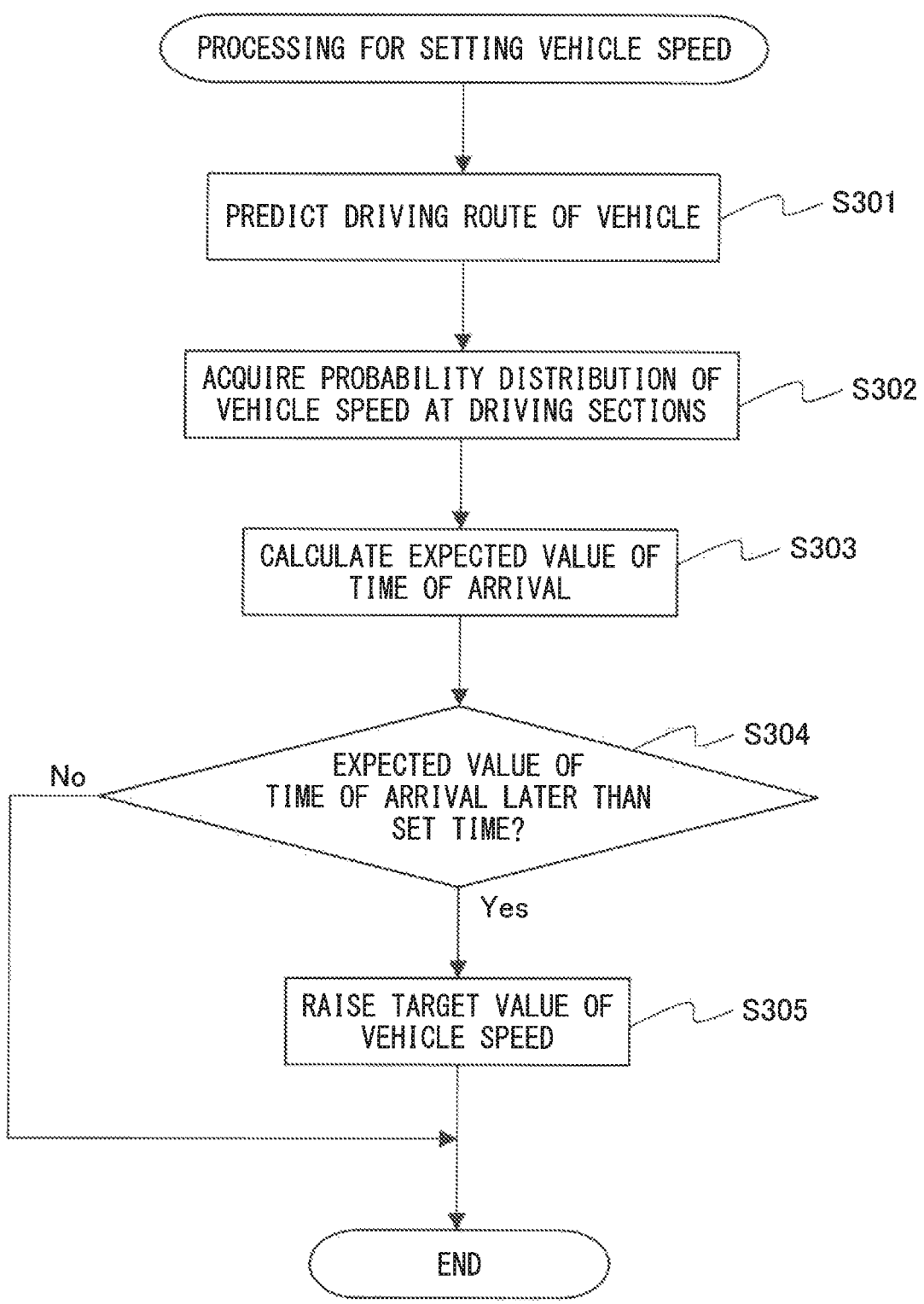
FIG. 9 is a flow chart showing the control routine of processing for setting a vehicle speed in a fourth embodiment of the present invention.

FIG. 9 is a flow chart showing the control routine of processing for setting a vehicle speed in the fourth embodiment of the present invention. The present control routine is repeatedly performed by the ECU 60.

First, at step S301, in the same way as step S101 of FIG. 5, the vehicle control part 61 predicts the driving route of the vehicle 1 and identifies all of the driving sections of the driving route. Next, at step S302, the vehicle control part 61 acquires the probability distribution of the vehicle speed for the driving sections of the driving route from the memory of the ECU 60.

Next, at step S303, the vehicle control part 61 uses the probability distribution of the vehicle speed for the driving sections to calculate the expected value of the time of arrival at the destination of the vehicle 1. Next, at step S304, the vehicle control part 61 judges whether the expected value of the time of arrival is later than a set time. The set time is, for example, the desired time of arrival at the destination input by the driver of the vehicle 1 to the navigation system 54 etc. If it is judged that the expected value of the time of arrival is equal to or earlier than the set time, the present control routine ends. On the other hand, if it is judged that the expected time of the time of arrival is later than the set time, the present control routine proceeds to step S305.

At step S305, the vehicle control part 61 raises the target value of the vehicle speed. Specifically, the vehicle control part 61 notifies the driver of the target value of the vehicle speed through the navigation system 54 or other human-machine interface (HMI). Note that, if acceleration and braking are automated in the vehicle 1, the vehicle control part 61 controls the various actuators so that the vehicle speed approaches the target value. After step S305, the present control routine ends.

Note that, in the fourth embodiment, the charging port 22 and charger 24 may be omitted from the vehicle 1, and the battery 20 need not be charged by the external power supply 70. That is, the vehicle 1 need not be a plug-in hybrid vehicle. Further, the vehicle 1 may be provided with only an internal combustion engine 10 as a power source able to output the power for driving. That is, the vehicle 1 need not be a hybrid vehicle. Further, the vehicle 1 may be provided with only a motor (first motor-generator 12, second motor-generator 16, etc.) as a power source able to output the power for driving. That is, the vehicle 1 may be an electric vehicle (EV).

Fifth Embodiment

The control device of the vehicle according to a fifth embodiment is basically similar in configuration and control to the control device of the vehicle according to the first embodiment except for the points explained below. For this reason, below, the fifth embodiment of the present invention will be explained focusing on the parts different from the first embodiment.

Figure 10:
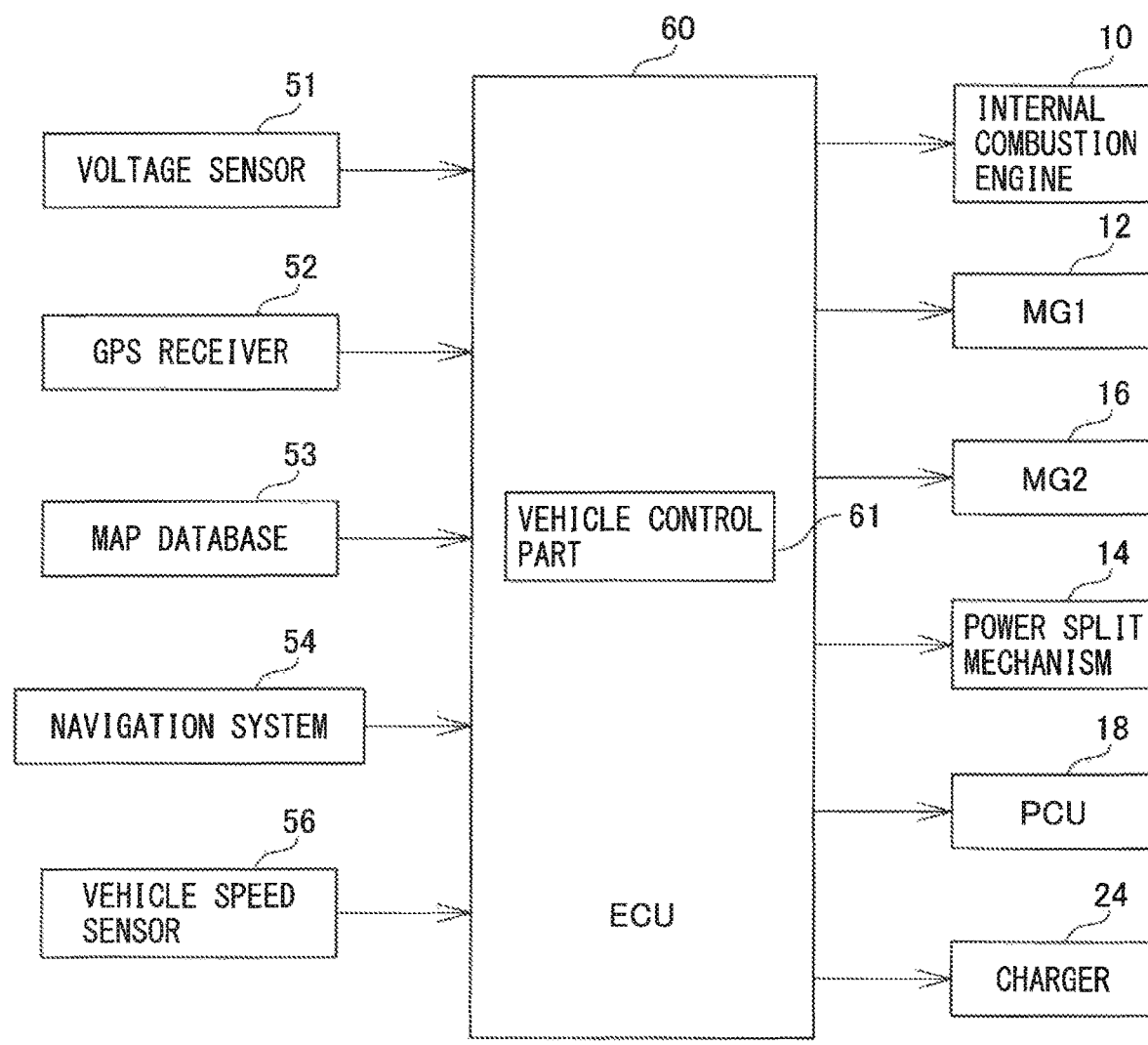
FIG. 10 is a block diagram schematically showing the configuration of a control device of a vehicle etc., according to a fifth embodiment of the present invention.

FIG. 10 is a block diagram schematically showing the configuration of the control device of the vehicle according to the fifth embodiment of the present invention etc. In the fifth embodiment, the ECU 60 is connected to the vehicle speed sensor 56 in addition to the voltage sensor 51, GPS receiver 52, map database 53, and navigation system 54.

The vehicle speed sensor 56 is provided at the vehicle 1 and detects the vehicle speed. The vehicle speed sensor 56 is connected with the ECU 60. The output of the vehicle speed sensor 56 is sent to the ECU 60.

As explained above, electric power is regenerated at the time of deceleration of the vehicle 1. The regenerated electric power generated by the second motor-generator 16 is stored in the battery 20. However, the regenerated electric power able to be generated by the second motor-generator 16 is limited by the properties of the second motor-generator 16 (size etc.). For this reason, if the brake pressure exceeds a predetermined value, braking is performed by a mechanical brake and regenerated electric power can no longer be recovered. As a result, the amount of electric power able to be consumed in the EV mode falls. Note that, the "brake pressure" means the force of depression of brake pedal provided at the vehicle 1.

Therefore, in the fifth embodiment, the vehicle control part 61 uses the probability distribution of the brake pressure for the driving section and vehicle speed to calculate the expected value of the amount of loss of the regenerated electric power. Further, the vehicle control part 61 sets the target value of the vehicle speed based on the expected value of the amount of loss of the regenerated electric power. The larger the vehicle speed, the larger the brake pressure becomes and the larger the amount of loss of regenerated electric power tends to become. For this reason, the vehicle control part 61 lowers the target value of the vehicle speed if the expected value of the amount of loss of the regenerated electric power is larger than a threshold value. By doing this, it is possible to decrease the amount of loss of the regenerated electric power.

Specifically, the vehicle control part 61 uses the following equation (12) to calculate the expected value L of the amount of loss of the regenerated electric power:

[Equation 7]

$$L = \sum_v P_{vkb} g(b) \quad (12)$$

Here, "g" is a function for calculating the amount of loss of the regenerated electric power based on the brake pressure and has the brake pressure "b" as a variable. The function "g" is set to become zero when the brake pressure "b" is equal to or less than a predetermined value and to become larger the larger the brake pressure "b". $P_{vkb}$ is the probability of the brake pressure becoming "b" at a driving section "k" and vehicle speed "v" and is acquired from the probability distribution of the brake pressure with respect to the driving section "k" and vehicle speed "v". The probability distribution of the brake pressure with respect to the driving section "k" and vehicle speed "v" is stored in advance in the memory of the ECU 60.

As will be understood from the above equation (12), the expected value L of the amount of loss of the regenerated electric power is calculated by cumulatively adding the values obtained by multiplying the probabilities $P_{vkb}$ corresponding to the brake pressures "b" with the values calculated by the function "g" using the brake pressures "b". The number of brake pressures "b" which are cumulatively added becomes the number of classes of brake pressure at the probability distribution of the brake pressure. Further, as the value of the brake pressure "b", the average value of each class is used. Note that, the brake pressure "b" may be a continuous value.

<Processing for Setting Vehicle Speed>

Figure 11:
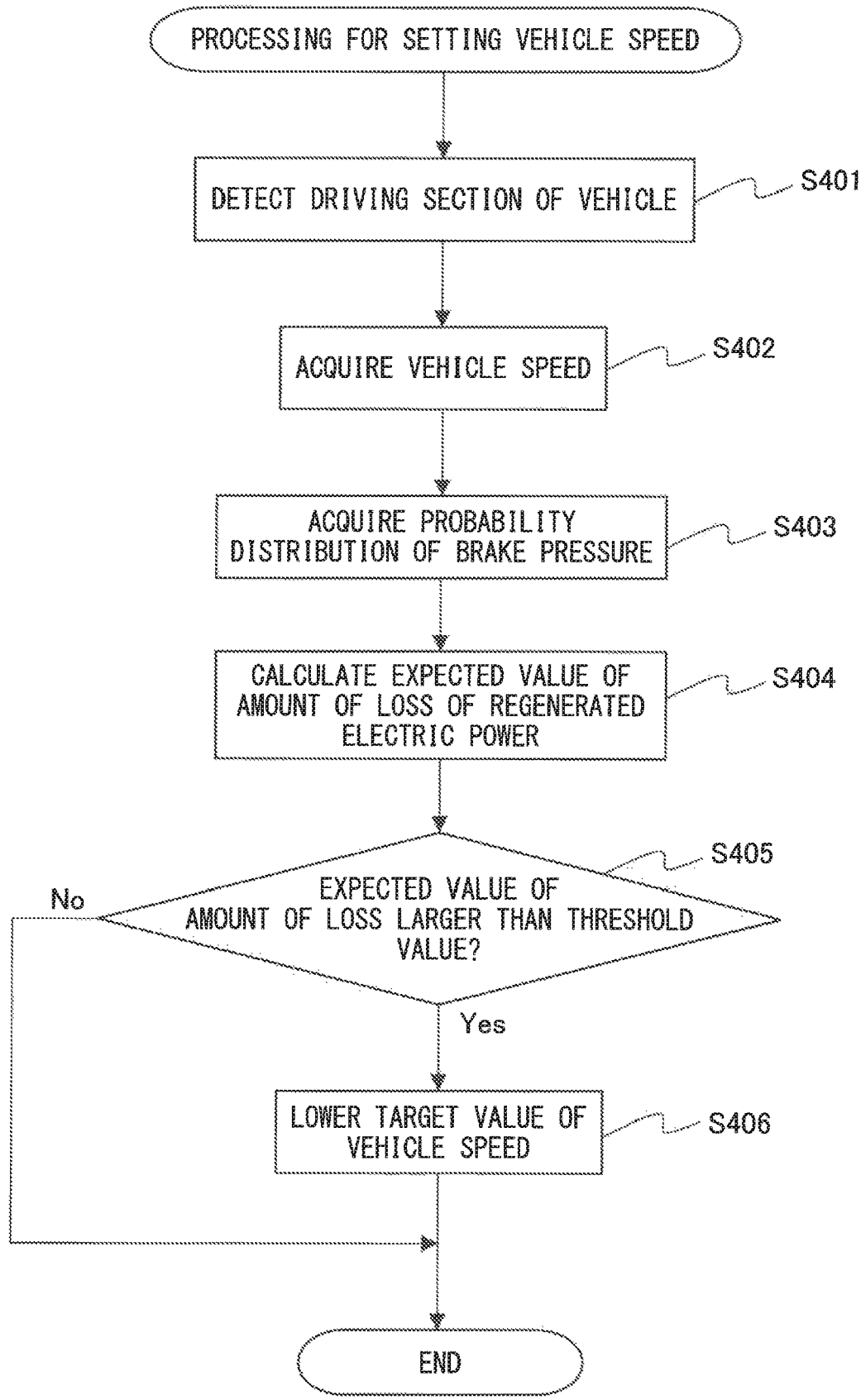
FIG. 11 is a flow chart showing the control routine of processing for setting a vehicle speed in a fifth embodiment of the present invention.

FIG. 11 is a flow chart showing the control routine of processing for setting the vehicle speed in the fifth embodiment of the present invention. The present control routine is repeatedly performed by the ECU 60.

First, at step S401, the vehicle control part 61 detects the current driving section of the vehicle 1 based on the output of the GPS receiver 52 and the map information of the map database 53. Next, at step S402, the vehicle control part 61 acquires the vehicle speed detected by the vehicle speed sensor 56.

Next, at step S403, the vehicle control part 61 acquires the probability distribution of the brake pressure with respect to the current driving section and vehicle speed. Next, at step S404, the vehicle control part 61 uses the probability distribution of brake pressure with respect to the current driving section and vehicle speed to calculate the expected value of the amount of loss of the regenerated electric power.

Next, at step S405, the vehicle control part 61 judges whether the expected value of the amount of loss of the regenerated electric power is larger than a threshold value. The threshold value is determined in advance. If it is judged that the expected value of the amount of loss of the regenerated electric power is equal to or less than the threshold value, the present control routine ends. On the other hand, if it is judged that the expected value of the amount of loss of the regenerated electric power is larger than the threshold value, the present control routine proceeds to step S406.

At step S406, the vehicle control part 61 lowers the target value of the vehicle speed, Specifically, the vehicle control part 61 notifies the target value of the vehicle speed to the driver through the navigation system 54 or other HMI. Note that, if acceleration and braking are automated in the vehicle 1, the vehicle control part 61 controls the various actuators so that the vehicle speed approaches the target value. After step S406, the present control routine ends.

Note that, the probability distribution of the vehicle speed for the driving section may be used for calculating the expected value of the amount of loss of the regenerated electric power. In this case, the vehicle control part 61 acquires the probability distribution of the vehicle speed for the current driving section at step S402 and acquires the probability distribution of the brake pressure for the current driving section and vehicle speeds at step S403.

Note that, in the fifth embodiment, the charging port 22 and charger 24 may be omitted from the vehicle 1 and the battery 20 does not have to be charged by the external power supply 70. That is, the vehicle 1 need not be a plug-in hybrid vehicle. Further, the vehicle 1 may be provided with only a motor (first motor-generator 12, second motor-generator 16, etc.) as a power source able to output power for driving. That is, the vehicle 1 may be an electric vehicle (EV).

Sixth Embodiment

The control device of the vehicle according to a sixth embodiment is basically similar in configuration and control to the control device of the vehicle according to the first embodiment except for the points explained below. For this reason, below, the sixth embodiment of the present invention will be explained focusing on the parts different from the first embodiment.

Figure 12:
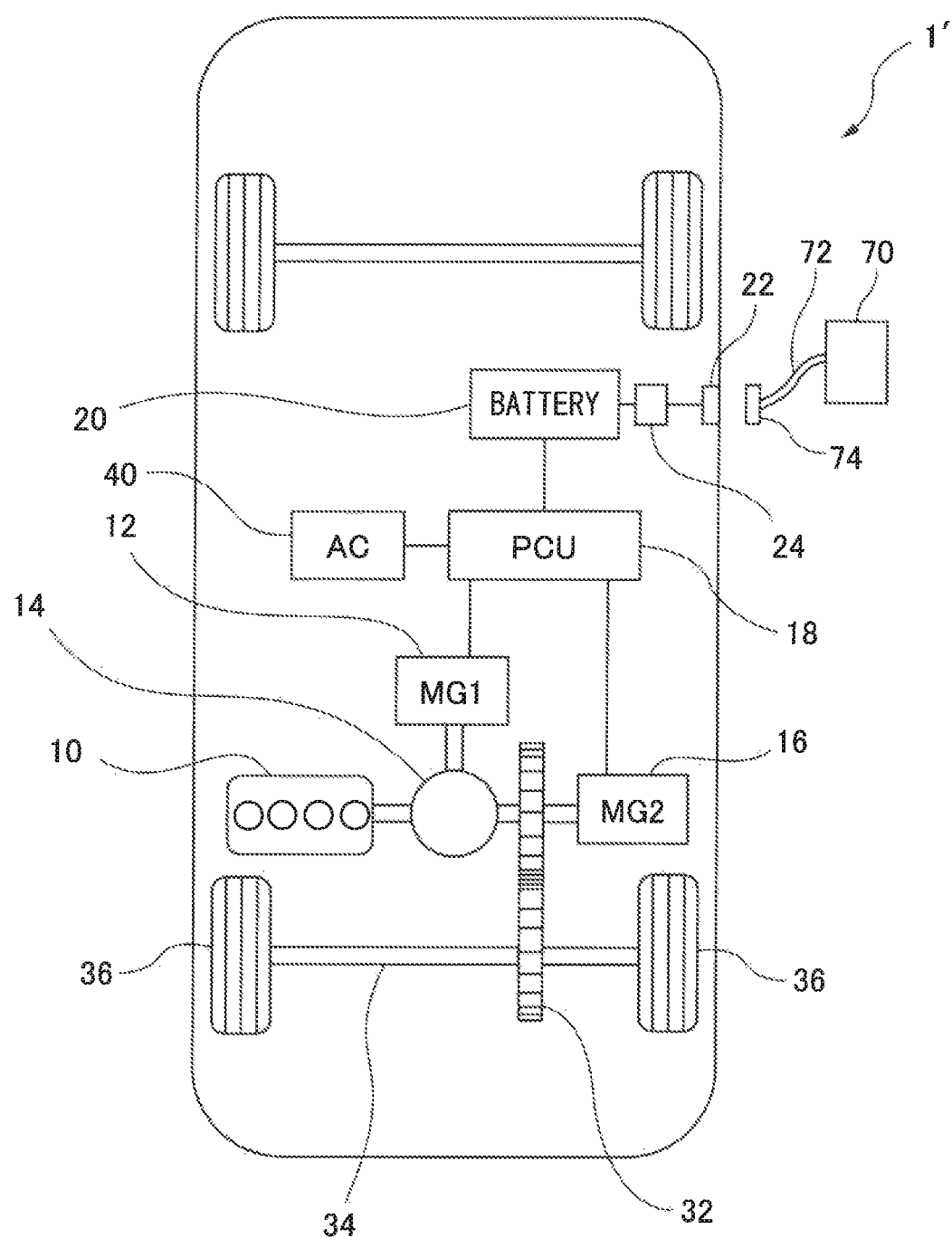
FIG. 12 is a view schematically showing the configuration of a vehicle in which a control device of a vehicle according to a sixth embodiment of the present invention is used.

FIG. 12 is a view schematically showing the configuration of a vehicle in which the control device of the vehicle according to the sixth embodiment of the present invention is used. The vehicle 1' is provided with an air-conditioner 40 (below, referred to as an "AC").

At the time of operation of the AC 40, electric power is supplied from the battery 20 through the PCU 18 to the AC 40. For this reason, at the time of operation of the AC 40, the electric power of the battery 20 is consumed by the AC 40. To maintain the inside of the vehicle at a comfortable temperature by the AC 40, it is necessary to store the required amount of electric power corresponding to the AC load in the battery 20. However, if the amount of stored power of the battery 20 is maintained at an excessive value, the amount of electric power able to be consumed in the EV mode becomes smaller and the fuel efficiency of the vehicle 1 deteriorates.

Further, the AC load is correlated with the outside air temperature and the outside air humidity. Therefore, in the sixth embodiment, the vehicle control part 61 uses the probability distribution of the combination of the outside air temperature and the outside air humidity with respect to the date and time to calculate the expected value of the consumed electric power of the AC 40 in a predetermined time period in the future (below, referred to as the "future consumed electric power of the AC 40"). Further, the vehicle control part 61 controls the SOC of the battery 20 based on the expected value of the future consumed electric power of the AC 40. Specifically, the vehicle control part 61 controls the SOC of the battery 20 so that the amount of stored power of the battery 20 becomes equal to or more than the expected value of the future consumed electric power of the AC 40. By doing this, the temperature inside the vehicle can be kept from fluctuating due to insufficient electric power.

Specifically, the vehicle control part 61 uses the following equation (13) to calculate the expected value CP of the future consumed electric power of the AC 40:

[Equation 8]

$$CP = \int_{t1}^{t2} \sum_{Ta} P_{tTa} h(T, a) dt \quad (13)$$

The following equation (14) is a part of the right side of the above equation (13) and corresponds to the expected value $CP_t$ of the consumed electric power of the AC 40 at the date and time "1".

[Equation 9]

$$CP_t = \sum_{Ta} P_{tTa} h(T, a) \quad (14)$$

Here, "h" is a function for calculating the AC load based on the outside air temperature and the outside air humidity and has the outside air temperature T and the outside air humidity "a." as variables. $P_{tTa}$ is the probability of the outside air temperature becoming T and the outside air humidity becoming "a" at the date and time "t" and is acquired from the probability distribution of the combination of the outside air temperature T and the outside air humidity "a" at the date and time "t". The probability distribution of the combination of the outside air temperature T and the outside air humidity "a" at the date and time "t" is stored in advance in the memory of the ECU 60.

As will be understood from the above equation (14), the expected value $CP_t$ of the consumed electric power of the AC 40 at the date and time "t" can calculated by cumulatively adding the values obtained by multiplying the probabilities $P_{tTa}$ corresponding to the combinations of the outside air temperature T and the outside air humidity "a" with the values calculated by the function "h" using the combinations. The number of the combinations of the outside air temperatures T and the outside air humidities "a" which are cumulatively added becomes the number of combinations in the probability distribution of the combinations of the outside air temperature and the outside air humidity.

Therefore, as will be understood from the above equation (13), the vehicle control part 61 cumulatively adds the expected values $CP_t$ of the consumed electric power of the AC 40 at different dates and times "t" over a predetermined time period to thereby calculate the expected value CP of the future consumed electric power of the AC 40. In the above equation (13), the date and time t1 is the date and time a predetermined time after the current date and time, while the date and time t2 is the date and time a predetermined time after the date and time t1. The time period from the date and time t1 to the date and time t2 corresponds to a future predetermined time period.

<SOC Control>

Figure 13:
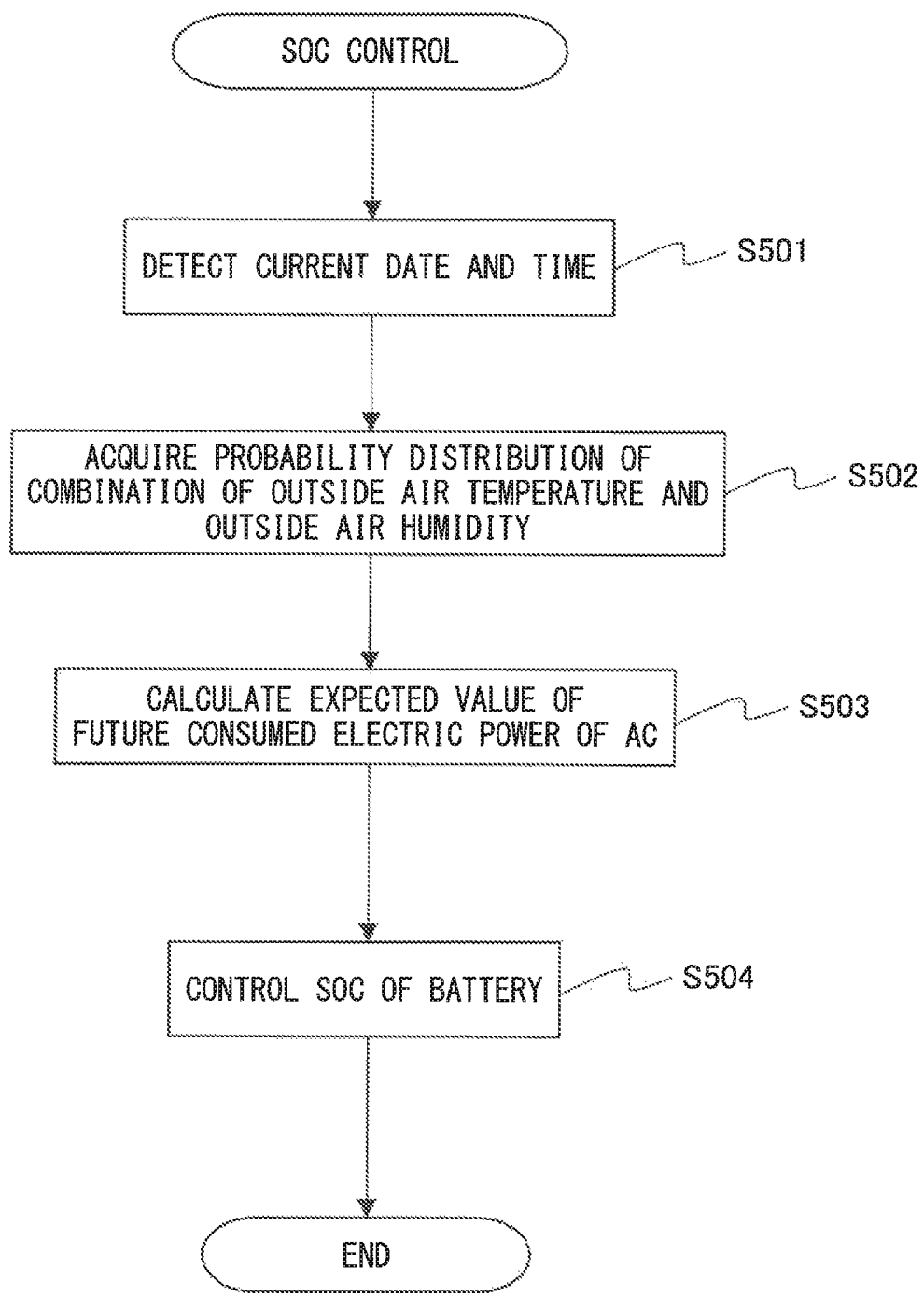
FIG. 13 is a flow chart showing the control routine of SOC control in a sixth embodiment of the present invention.

FIG. 13 is a flow chart showing the control routine of SOC control in the sixth embodiment of the present invention. The present control routine is repeatedly performed by the ECU 60.

First, at step S501, the vehicle control part 61 detects the current date and time based on the output of a digital clock built in the ECU 60 or the information received from outside the vehicle 1 through a vehicle-mounted communicating device. Next, at step S502, the vehicle control part 61 calculates the date and time t1 and the date and time t2 from the current date and time and acquires the probability distribution of the combination of the outside air temperature and the outside air humidity with respect to the date and time t1 and the date and time t2. Next, at step S503, the vehicle control part 61 uses the probability distribution of the combination of the outside air temperature and outside air humidity with respect to the date and time t1 and the date and time t2 to calculate the expected value of the future consumed electric power of the AC 40.

Next, at step S504, the vehicle control part 61 controls the SOC of the battery 20 so that the amount of stored power of the battery 20 becomes equal to or more than the expected value of the future consumed electric power of the AC 40. For example, the vehicle control part 61 sets the target SOC of the battery 20 to the value of the SOC of the battery 20 corresponding to the expected value of the future consumed electric power of the AC 40. The target SOC is, for example, realized by control of the driving mode of the vehicle 1. After step S504, the present control routine ends.

Note that, the function "h" for calculating the AC load may have only the outside air temperature T as a variable. That is, the vehicle control part 61 may use the probability distribution of the outside air temperature for the date and time to calculate the expected value of the future consumed electric power of the AC 40. In this case, at step S502, the vehicle control part 61 acquires the probability distribution of the outside air temperature for the date and time t1 to the date and time t2.

Seventh Embodiment

The control device of the vehicle according to a seventh embodiment is basically similar in configuration and control to the control device of the vehicle according to the first embodiment except for the points explained below. For this reason, below, the seventh embodiment of the present invention will be explained focusing on the parts different from the first embodiment.

In the seventh embodiment, in the same way as the sixth embodiment, as shown in FIG. 12, the vehicle is provided with an AC 40. The AC 40 has a heating function. However, if in particular the AC 40 is a heat pump, at the time of cold weather, less heat is taken in from the atmosphere, so the heating ability of the AC 40 falls. For this reason, at the time of cold weather, the waste heat of the internal combustion engine 10 has to be used to heat the inside of the passenger compartment. However, if frequently operating the internal combustion engine 10 in preparation for a drop in the outside air temperature, the fuel efficiency of the vehicle 1 deteriorates.

Therefore, in the seventh embodiment, the vehicle control part 61 calculates the expected value of the amount of fuel consumption for warmup in a future predetermined time period using the probability distribution of the outside air temperature with respect to the date and time (below, referred to as the "future amount of fuel consumption"). Further, the vehicle control part 61 selects the driving mode of the vehicle 1 based on the expected value of the future amount of fuel consumption. Specifically, the vehicle control part 61 selects the HV mode as the current driving mode of the vehicle 1 if the expected value of the future amount of fuel consumption is larger than the threshold value. By doing this, it is possible to keep the fuel efficiency of the vehicle 1 from deteriorating while keeping the temperature in the passenger compartment from fluctuating.

Specifically, the vehicle control part 61 uses the following equation (15) to calculate the expected value of the future amount of fuel consumption FF:

[Equation 10]

$$FF = \int_{t1}^{t2} \sum_{T} P_{tT} i(T) dt \quad (15)$$

The following equation (16) is a part of the right side of the above equation (15) and corresponds to the expected value $FF_t$ of the amount of fuel consumption for warmup at the date and time "t":

[Equation 11]

$$FF_t = \sum_{T} P_{tT} i(T) \quad (16)$$

Here, "i" is a function for calculating the amount of fuel consumption for warmup based on the outside air temperature and has the outside air temperature T as a variable. The function "i" is set to become zero when the outside air temperature T is equal to or more than a predetermined value and to become larger the lower the outside air temperature T. $P_{tT}$ is the probability of the outside air temperature becoming T at the date and time "t" and is acquired from the probability distribution of the outside air temperature T with respect to the date and time "t". The probability distribution of the outside air temperature T with respect to the date and time "t" is stored in advance in the memory of the ECU 60.

As will be understood from the above equation (16), the expected value $FF_t$ of the amount of fuel consumption for warmup at the date and time "t" is calculated by cumulatively adding the values obtained by multiplying the probabilities $P_{tT}$ corresponding to the outside air temperatures T with the values calculated by the function "i" using the different outside air temperatures T. The number of the outside air temperatures T which are cumulatively added becomes the number of classes of temperature of the probability distribution of the outside air temperature. Further, as the value of the outside air temperature T, the average value of each temperature class is used. Note that, the outside air temperature T may be a continuous value.

Therefore, as will be understood from the above equation (15), the vehicle control part 61 cumulatively adds the expected value $FF_t$ of the amount of fuel consumption for warmup at the different dates and times "t" over a predetermined time period to calculate the expected value of the future amount of fuel consumption FF. In the above equation (15), the date and time t1 is a date and time a predetermined time after the current date and time, while the date and time t2 is a date and time a predetermined time after the date and time t1. The time period from the date and time t1 to the date and time t2 corresponds to the predetermined time period in the future.

<Processing for Selecting Driving Mode>

Figure 14:
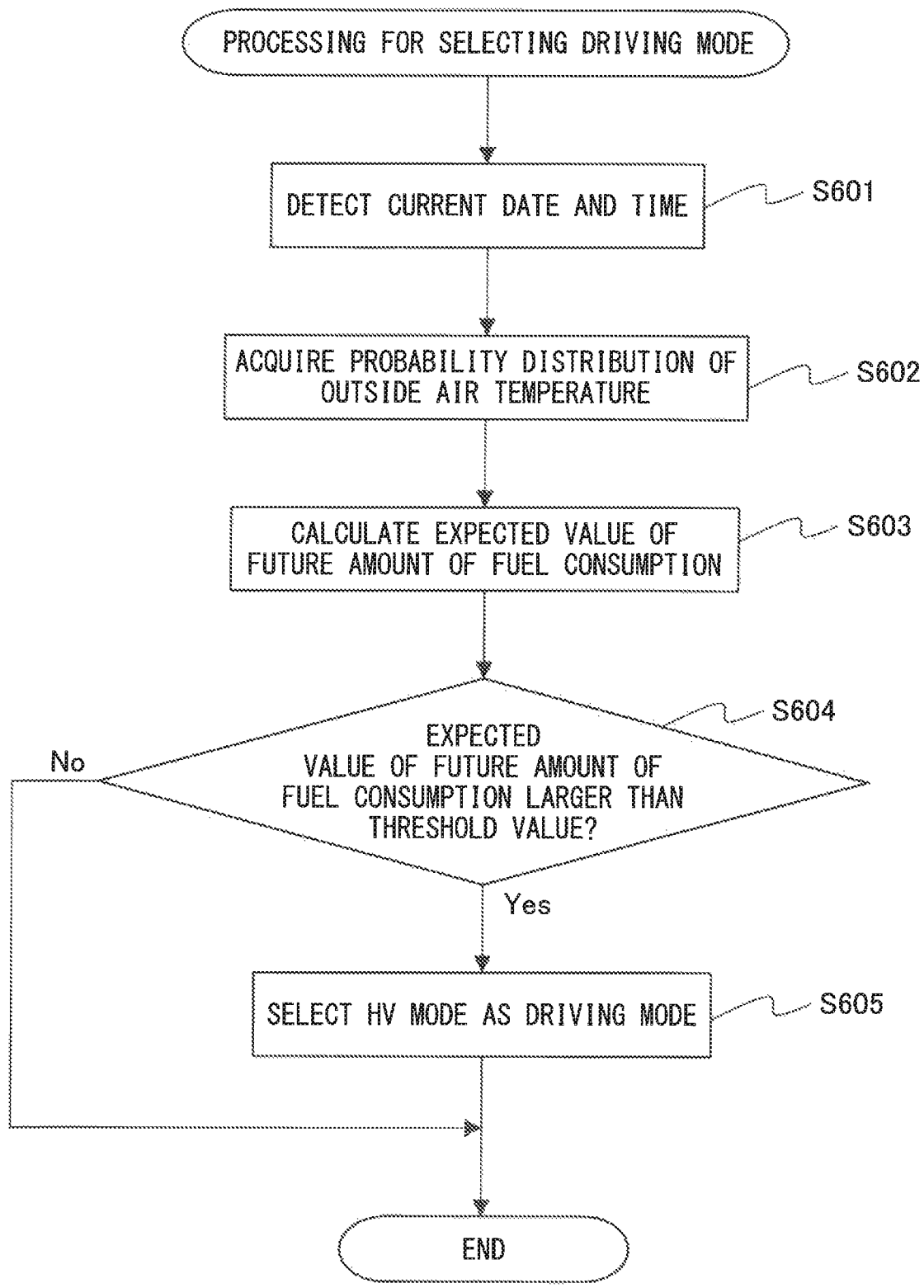
FIG. 14 is a flow chart showing the control routine of processing for selecting the driving mode in a seventh embodiment of the present invention.

FIG. 14 is a flow chart showing the control routine of processing for selection of the driving mode in a seventh embodiment of the present invention. The present control routine is repeatedly performed by the ECU 60.

First, at step S601, the vehicle control part 61 detects the current date and time based on the output of a digital clock built in the ECU 60 or the information received from outside the vehicle 1 through a vehicle-mounted communicating device. Next, at step S602, the vehicle control part 61 calculates the date and time t1 and the date and time t2 from the current date and time and acquires the probability distribution of the outside air temperature with respect to the date and time t1 to the date and time t2. Next, at step S603, the vehicle control part 61 uses the probability distribution of the outside air temperature with respect to the date and time t1 to the date and time t2 to calculate the expected value of the future amount of fuel consumption.

Next, at step S604, the vehicle control part 61 judges whether the expected value of the future amount of fuel consumption is larger than the threshold value. The threshold value is determined in advance. If it is judged that the expected value of the future amount of fuel consumption is equal to or less than the threshold value, the present control routine ends. On the other hand, if it is judged that the expected value of the future amount of fuel consumption is larger than the threshold value, the present control routine proceeds to step S605.

At step S605, the vehicle control part 61 selects the mode as the current driving mode of the vehicle 1. Specifically, the vehicle control part 61 operates the internal combustion engine 10. After step S605, the present control routine ends.

Eighth Embodiment

The control device of the vehicle according to an eighth embodiment is basically similar in configuration and control to the control device of the vehicle according to the first embodiment except for the points explained below. For this reason, below, the eighth embodiment of the present invention will be explained focusing on the parts different from the first embodiment.

As explained above, in the vehicle 1, it is possible to charge the battery 20 by the external power supply 70. For this reason, by rendering the battery 20 a fully charged state before departure, it is possible to extend the driving distance in the EV mode and in turn possible to improve the fuel efficiency of the vehicle 1. However, if the battery 20 is maintained in a fully charged state, deterioration of the battery 20 progresses. For this reason, to suppress deterioration of the battery 20 while improving the fuel efficiency of the vehicle 1, it is necessary to start charging the battery 20 at a suitable timing before departure.

Therefore, at the eighth embodiment, the vehicle control part 61 sets the charging start time of the battery 20 based on the expected value of the amount of stored power by the battery 20 at the time of departure and the expected value of the amount of electric power consumption of the battery 20 from departure to recharging (below, referred to as the "predicted amount of electric power consumption"). Specifically, the vehicle control part 61 sets the charging start time of the battery so that the expected value of the amount of stored power of the battery 20 at the time of departure becomes equal to or more than an expected value of the predicted amount of electric power consumption. By doing this, it is possible to keep the electric power for driving from becoming insufficient while reducing the time at which the battery 20 is maintained at the fully charged state. As a result, it is possible to suppress deterioration of the battery 20 while improving the fuel efficiency of the vehicle 1.

The vehicle control part 61 uses the probability distribution of the time of departure with respect to the time of arrival at the charging point to calculate the expected value of the amount of stored power of the battery 20 at the time of departure. Specifically, the vehicle control part 61 uses the following equation (17) to calculate the expected value BC of the amount of stored power of the battery 20 at the time of departure:

[Equation 12]

$$BC = C + A\left(\sum_T P_{py} y - s\right) \quad (17)$$

Here, C is the amount of stored power of the battery 20 before starting charging. The second term at the right side of the above equation (17) shows the expected value of the amount of stored power stored in the battery 20 due to charging. A is the amount of stored power per unit time and is determined in advance. "y" is the time of departure, while "s" is the charging start time. Note that, the time of departure "y" and the charging start time "s" are expressed as the difference from the time of arrival at the charging point. $P_{py}$ is the probability of the time of departure becoming "y" at the time of arrival "p" at the charging point and is acquired from the probability distribution of the time of departure with respect to time of arrival "p" at the charging point. The probability distribution of the time of departure with respect to time of arrival "p" at the charging point is stored in advance in the memory of the ECU 60.

The expected value BC of the amount of stored power of the battery 20 at the time of departure is calculated by adding the expected value of the amount of stored power stored in the battery 20 by charging to the amount of stored power of the battery 20 before start of charging. The expected value of the amount of stored power stored in the battery 20 by charging is calculated by multiplying the amount of stored power A per unit time with the expected value of the charging time. The expected value of the charging time is calculated by subtracting the charging start time from the expected value of the time of departure.

Further, the probability distribution of the time of departure with respect to the time of arrival at the charging point and the probability distribution of the predicted amount of electric power consumption with respect to the time of departure are used to calculate the expected value of the predicted amount of electric power consumption. Specifically, the vehicle control part 61 uses the following equation (18) to calculate the expected value EC of the predicted amount of electric power consumption.

[Equation 13]

$$EC = \sum_y \sum_c P_{py} P_{yc} c \quad (18)$$

Here, $P_{py}$ is the probability of the time of departure becoming "y" at the time of arrival "p" at the charging point and is acquired from the probability distribution of the time of departure with respect to the time of arrival "p" at the charging point time. The probability distribution of the time of departure with respect to the time of arrival "p" at the charging point time is stored in advance in the memory of the ECU 60.

The following equation (19) is a part of the right side of the above equation (18) and corresponds to the expected value $EC_y$ of the predicted amount of electric power consumption with respect to the time of departure "y".

[Equation 14]

$$EC_y = \sum_c P_{yc} c. \quad (19)$$

Here, $P_{yc}$ is the probability of the predicted amount of electric power consumption becoming "c" at the time of departure "y" and is acquired from the probability distribution of the predicted amount of electric power consumption with respect to the time of departure "y". The probability distribution of the predicted amount of electric power consumption with respect to the time of departure "y" is stored in advance in the memory of the ECU 60.

As will be understood from the above equation (19), the expected value $EC_y$ of the predicted amount of electric power consumption for the time of departure "y" is calculated by cumulatively adding the values obtained by multiplying the probabilities $P_{yc}$ corresponding to the predicted amounts of electric power consumption "c" with the predicted amounts of electric power consumption "c". The number of the predicted amounts of electric power consumption "c" which are cumulatively added becomes the number of classes of the predicted amount of electric power consumption in the probability distribution of the predicted amount of electric power consumption. Further, as the value of the predicted amount of electric power consumption "c", the average value of each class is used. Note that, the predicted amount of electric power consumption "c" may be a continuous value.

Therefore, as will be understood from the above equation (18), the vehicle control part 61 cumulatively adds the values obtained by multiplying the probability $P_{py}$ corresponding to the different times of departure "y" with the expected values $EC_y$ of the predicted amount of electric power consumption for the different times of departure "y" to calculate the expected value EC of the predicted amount of electric power consumption, <Processing for Setting Charging Start Time>

Figure 15:
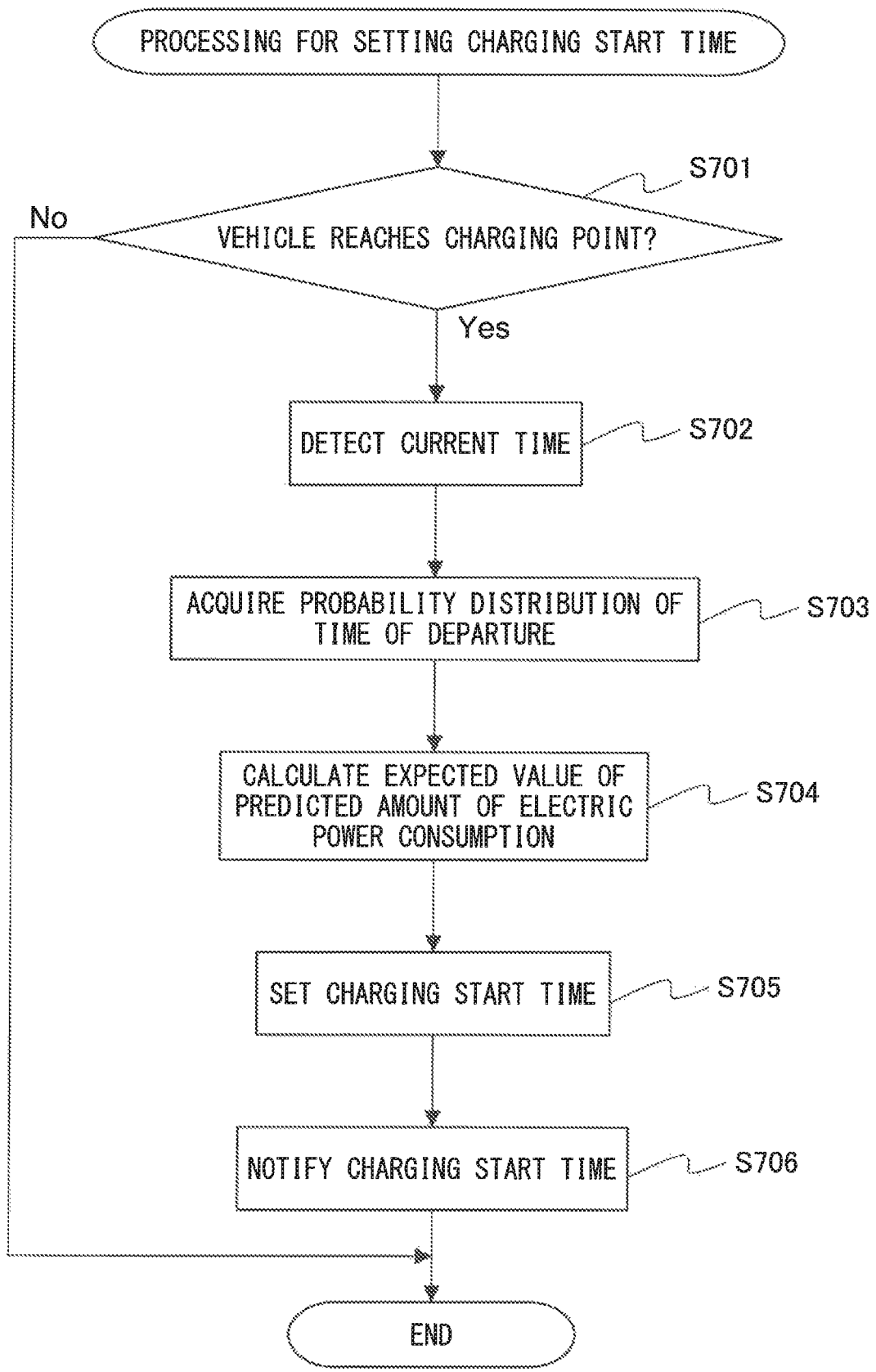
FIG. 15 is a flow chart showing the control routine of processing for setting the charging start time in an eighth embodiment of the present invention.

FIG. 15 is a flow chart showing the control routine of processing for setting the charging start time in an eighth embodiment of the present invention. The present control routine is repeatedly performed by the ECU 60.

First, at step S701, the vehicle control part 61 judges whether the vehicle 1 has reached a charging point based on the output of the GPS receiver 52 and the map information of the map database 53. The charging point is, for example, the home, a parking lot at which an external power supply 70 is provided, a charging station, etc. The charging points are recorded in advance in the map database 53. For example, the charging points are successively recorded in accordance with entry by the driver or state of utilization of an external power supply 70 of a charging point.

Next, at step S702, the vehicle control part 61 detects the current time, that is, the time of arrival at the charging point based on output of a digital clock built in the ECU 60 or the information received from outside the vehicle 1 through a vehicle-mounted communicating device. Next, at step S703, the vehicle control part 61 acquires the probability distribution of the time of departure with respect to the time of arrival at the charging point.

Next, at step S704, the vehicle control part 61 uses the probability distribution of the time of departure with respect to the time of arrival at a charging point and the probability distribution of the predicted amount of electric power consumption with respect to the time of departure to calculate the expected value of the predicted amount of the electric power consumption. Next, at step S705, the vehicle control part 61 uses the probability distribution of the time of departure with respect to the time of arrival at the charging point to calculate the expected value of the amount of stored power of the battery 20 at the time of departure and sets the charging start time so that this expected value becomes equal to or more than an expected value of the predicted amount of electric power consumption.

Next, at step S706, the vehicle control part 61 notifies the driver of the charging start time through the navigation system 54 or another HMI. Note that, at step S706, the vehicle control part 61 may control the charger 24 etc., so that the battery 20 starts being charged at the charging start time. After step S706, the present control routine ends.

Other Embodiments

Above, preferred embodiments according to the present invention were explained, but the present invention is not limited to these embodiments and can be corrected and changed in various ways within the language of the claims.

For example, the predetermined parameters for which the probability distribution is generated is not limited to the vehicle speed, brake pressure, outside air temperature, outside air humidity, time of departure, and amount of electric power consumption of the battery. The predetermined parameter may be the demanded torque, relative speed with a preceding vehicle, relative distance with a preceding vehicle, AC load, acceleration of the vehicle, number of passengers, etc.

Further, in the above embodiments, the probability distribution of a predetermined parameter for a predetermined condition is used to calculate an expected value of an evaluation value, but the predetermined condition is not limited to a driving section, vehicle speed, date and time, time of arrival at a charging point, and time of departure. The predetermined condition may be the direction of advance of the vehicle, type of road (highway, toll road, bypass road, general road, private road, school road, one-way road, etc.), hours, season, weekends and holidays/weekdays, driver, gender of driver, age of driver, presence of any passengers, number of passengers, vehicle model, output of the power train (internal combustion engine, motor, battery, etc.), remaining amount of electric power of battery, weather, presence of sunlight, presence of a preceding vehicle, presence of a traffic light, presence of any railroad crossing, presence of a stop sign, etc.

The direction of advance of the vehicle, type of road, presence of a traffic light, presence of a railroad crossing, and presence of a stop sign are detected, for example, based on the output of a GPS receiver and map information of a map database. The hours, season, weekends and holidays/weekdays, for example, are detected by a digital clock built in the ECU or detected by receiving information from outside of the vehicle through a vehicle-mounted communicating device.

The driver, for example, is detected by the technique of learning of the seat position, voice recognition, image recognition using a camera (drive recorder, driver monitor camera, etc.), acquisition of an identifying number (MAC address etc.) of a mobile device (smart phone, tablet, etc.), learning of a past pattern of behavior, etc. The gender and age of the driver are detected by image recognition etc., or stored in advance in the ECU for each driver. The presence of any passengers and the number of passengers are, for example, detected by the above-mentioned method of detection of a driver or detected using a weight sensor detecting the weight of the load on each seat of the vehicle.

The vehicle model is stored in advance in the memory of the ECU. The output of the power train is detected from the command values etc., from the ECU. The remaining amount of electric power of the battery is detected based on the output of the voltage sensor etc. The weather and presence of any sunlight are detected based on outputs of a rain sensor, luminance sensor, etc., provided at the vehicle or detected by receiving information from outside of the vehicle through a vehicle-mounted communicating device. The presence of any vehicle in front is detected using a camera, radar, Lidar, etc., provided at the vehicle.

Further, the evaluation value for which the expected value is calculated using the probability distribution is not limited to the amount of electric power consumption, the amount of fuel consumption, the time of arrival at the destination, the amount of loss of regenerated electric power, the future consumed electric power of the AC, the future amount of fuel consumption, the amount of stored power of the battery 20 at the time of departure, and the predicted amount of electric power consumption. The evaluation value may be the concentration of a toxic substance discharged from the vehicle (CO, HC, NOx, PM, etc.), the temperature in the vehicle, vibration of the vehicle, front-back G, a parameter showing safety (number of times of sudden braking etc.), a parameter showing drivability (response to accelerator operation, response to steering operation, response to brake operation, number of times of behavior unrelated to operation, etc.), etc.

Further, the above embodiments can be freely combined. For example, the second embodiment or third embodiment can be combined with the fourth embodiment, fifth embodiment, sixth embodiment, seventh embodiment, or eighth embodiment.

If the second embodiment or third embodiment is combined with the fourth embodiment, the driving data acquiring device 55, for example, includes a vehicle speed sensor detecting a vehicle speed and acquires the vehicle speed as driving data while the vehicle 1 is being driven. The driving section when a vehicle speed is acquired by the driving data acquiring device 55 is detected based on the output of the GPS receiver 52 and the map information of the map database 53.

If the second embodiment or third embodiment is combined with the fifth embodiment, the driving data acquiring device 55, for example, includes a brake pressure sensor detecting a brake pressure and acquires the brake pressure as driving data while the vehicle 1 is being driven. The driving section when a brake pressure is acquired by the driving data acquiring device 55 is detected based on the output of the GPS receiver 52 and the map information of the map database 53. Further, the vehicle speed when a brake pressure is acquired by the driving data acquiring device 55 is detected by the vehicle speed sensor 56.

If the second embodiment or third embodiment is combined with the sixth embodiment, the driving data acquiring device 55, for example, includes a temperature sensor detecting an outside air temperature and a humidity sensor detecting an outside air humidity and acquires the outside air temperature and the outside air humidity as driving data while the vehicle 1 is being driven. Note that, the driving data acquiring device 55 may receive information from outside of the vehicle through a vehicle-mounted communicating device to detect the outside air temperature and the outside air humidity. The date and time when the outside air temperature and the outside air humidity are acquired by the driving data acquiring device 55 are detected by a digital clock built in the ECU or detected by receiving information from outside the vehicle through a vehicle-mounted communicating device.

If the second embodiment or third embodiment is combined with the seventh embodiment, the driving data acquiring device 55, for example, includes a temperature sensor detecting an outside air temperature and acquires the outside air temperature during driving of the vehicle 1 as the driving data. Note that, the driving data acquiring device 55 may receive information from outside the vehicle through the vehicle-mounted communicating device to detect the outside air temperature. The date and time when the outside air temperature is acquired by the driving data acquiring device 55 are detected by a digital clock built in the ECU or detected by receiving information from outside of the vehicle through a vehicle-mounted communicating device.

If the second embodiment or third embodiment is combined with the eighth embodiment, the driving data acquiring device 55 includes a voltage sensor 51 etc., and acquires the time of departure and predicted amount of electric power consumption as the driving data. The time of arrival at the charging point when the time of departure is acquired by the driving data acquiring device 55 and the time of departure when the predicted amount of electric power consumption is acquired by the driving data acquiring device 55 are detected by a digital clock built in the ECU or detected by receiving information from outside of the vehicle through a vehicle-mounted communicating device.

REFERENCE SIGNS LIST 1, 1'. vehicle
55. driving data acquiring device
60. electronic control unit (ECU)
61. vehicle control part
62. probability distribution generating part

The invention claimed is:

1. A control device of a vehicle comprising:
a vehicle control part configured to:
calculate an expected value of each of at least one evaluation value by using a probability distribution of at least one predetermined parameter;
control the vehicle based on the expected value, wherein
the at least one predetermined parameter is a vehicle speed,
the vehicle comprises an internal combustion engine and a motor configured to output power for driving and a battery supplying electric power to the motor and configured to be charged by an external power supply, and
the at least one evaluation value is an amount of electric power consumption and an amount of fuel consumption when the vehicle is being driven over a driving route from a current position to a destination; and
select a driving mode of the vehicle at each driving section of the driving route so that the expected value of the amount of electric power consumption satisfies a restricting condition and the expected value of the amount of fuel consumption becomes a minimum, wherein
the restricting condition is a condition at which the expected value of the amount of electric power consumption becomes less than or equal to a remaining amount of electric power of the battery or a value corresponding to the remaining amount.

2. The control device of a vehicle according to claim 1, further comprising:
a driving data acquiring device acquiring the at least one predetermined parameter as driving data; and
a probability distribution generating part configured to generate the probability distribution based on the driving data acquired by the driving data acquiring device.

3. The control device of a vehicle according to claim 2, wherein the probability distribution generating part is provided at an outside of the vehicle and is configured to receive the driving data from driving data acquiring devices provided at a plurality of vehicles.

4. A control device of a vehicle comprising:
an electronic control unit configured to:
calculate an expected value of each of at least one evaluation value by using a probability distribution of at least one predetermined parameter;
control the vehicle based on the expected value, wherein
the at least one predetermined parameter is a vehicle speed,
the vehicle comprises an internal combustion engine and a motor configured to output power for driving and a battery supplying electric power to the motor and configured to be charged by an external power supply, and
the at least one evaluation value is an amount of electric power consumption and an amount of fuel consumption when the vehicle is being driven over a driving route from a current position to a destination; and
select a driving mode of the vehicle at each driving section of the driving route so that the expected value of the amount of electric power consumption satisfies a restricting condition and the expected value of the amount of fuel consumption becomes a minimum, wherein
the restricting condition is a condition at which the expected value of the amount of electric power consumption becomes less than or equal to a remaining amount of electric power of the battery or a value corresponding to the remaining amount.

* * * * *